(12) United States Patent (10) Patent No.: US 9,386,744 B2
Black et al. (45) Date of Patent: Jul. 12, 2016

(54) PLANT TRIMMING APPARATUS AND METHODS OF USING THE SAME

(71) Applicant: Easy Trim, LLC, Denver, CO (US)

(72) Inventors: Joseph D. Black, Thornton, CO (US); Michael D. Cross, Arvada, CO (US)

(73) Assignee: EASY TRIM, LLC, Denver, CO (US)

( * ) Notice: Subject to any disclaimer, the term of this patent is extended or adjusted under 35 U.S.C. 154(b) by 37 days.

(21) Appl. No.: 14/365,178

(22) PCT Filed: Dec. 14, 2012

(86) PCT No.: PCT/US2012/069845
§ 371 (c)(1),
(2) Date: Jun. 13, 2014

(87) PCT Pub. No.: WO2013/090779
PCT Pub. Date: Jun. 20, 2013

(65) Prior Publication Data
US 2015/0027096 A1 Jan. 29, 2015

Related U.S. Application Data

(60) Provisional application No. 61/576,911, filed on Dec. 16, 2011.

(51) Int. Cl.
| | |
|---|---|
| *A01D 34/82* | (2006.01) |
| *A01D 45/00* | (2006.01) |
| *A01G 17/02* | (2006.01) |
| *A01D 46/00* | (2006.01) |
| *A01D 34/835* | (2006.01) |
| *A23N 15/00* | (2006.01) |

(52) U.S. Cl.
CPC ............... *A01D 45/00* (2013.01); *A01D 34/82* (2013.01); *A01D 34/835* (2013.01); *A01D 46/005* (2013.01); *A01G 17/026* (2013.01); *A23N 15/00* (2013.01)

(58) Field of Classification Search
CPC ..... A01D 34/63; A01D 43/077; A01D 45/00; A01D 46/005; A01D 34/82; A01D 34/835; A01G 1/125; A01G 3/002; A01G 3/08; A01G 3/00; A01G 17/026; A01G 17/00; A01G 17/02; B02C 18/083; B02C 18/10; B02C 18/18; B02C 18/2216; E01H 1/0836; A23N 15/00

USPC ............ 56/10.1, 13.1, 16.9, 13.4, 202, 320.2, 56/235; 241/101.1, 101.78, 92, 30, 166, 241/167, 60, 74, 81, 277
See application file for complete search history.

(56) References Cited

U.S. PATENT DOCUMENTS

| | | | | |
|---|---|---|---|---|
| 4,043,100 | A | * 8/1977 | Aumann | A01D 43/077 56/13.1 |
| 4,819,417 | A | * 4/1989 | Bryant | A01D 43/077 56/16.6 |
| 5,231,827 | A | * 8/1993 | Connolly | A01G 1/125 241/101.1 |

(Continued)

FOREIGN PATENT DOCUMENTS

| | | |
|---|---|---|
| CN | 2807756 Y | 8/2006 |
| CN | 200953755 Y | 10/2007 |

(Continued)

OTHER PUBLICATIONS

Extended European Search Report, issued Aug. 11, 2015 for European Patent Application No. 12856796.3. 5 pages.
International Search Report and Written Opinion issued by the International Searching Authority of Korea for PCT/US12/69845 on Apr. 26, 2013. 7 pages.

*Primary Examiner* — Robert Pezzuto
(74) *Attorney, Agent, or Firm* — Perkins Coie LLP

(57) ABSTRACT

A plant trimming apparatus comprising a container having top and bottom end regions and a grate supported therein. A cutting blade and a fan blade are rotatably supported within the container. The fan blade is operative to create an air flow from the top end region to the bottom end region+vortex. The apparatus comprises a blade motor including a shaft, wherein the cutting blade and the fan blade are supported on the shaft. The cutting blade includes a plurality of forward or rear leaning blades that cooperate with the grate openings to cut parts off the plant. The blade has an outer ring extending between each of the plurality of blades. A lid assembly is attached to an upper rim portion of the container and supports an agitator motor that is connected to an agitator arm that is disposed within the container above the grate.

25 Claims, 28 Drawing Sheets

(56) References Cited

U.S. PATENT DOCUMENTS

| | | | |
|---|---|---|---|
| 6,910,648 B1 * | 6/2005 | Reinhold | B02C 18/083 241/101.78 |
| 7,168,643 B2 | 1/2007 | Mercier | |
| 7,305,812 B2 * | 12/2007 | Schloesser | A01G 17/026 56/230 |
| 8,757,524 B2 * | 6/2014 | Mosman | A01G 3/08 241/166 |
| 2007/0069056 A1 | 3/2007 | Shouse et al. | |

FOREIGN PATENT DOCUMENTS

| | | |
|---|---|---|
| CN | 201160378 Y | 12/2008 |
| CN | 101401505 A | 4/2009 |
| CN | 201274675 Y | 7/2009 |
| CN | 201383946 Y | 1/2010 |
| CN | 201537519 U | 8/2010 |
| WO | WO 02/091863 | 11/2002 |
| WO | WO 2005/051108 | 6/2005 |

\* cited by examiner

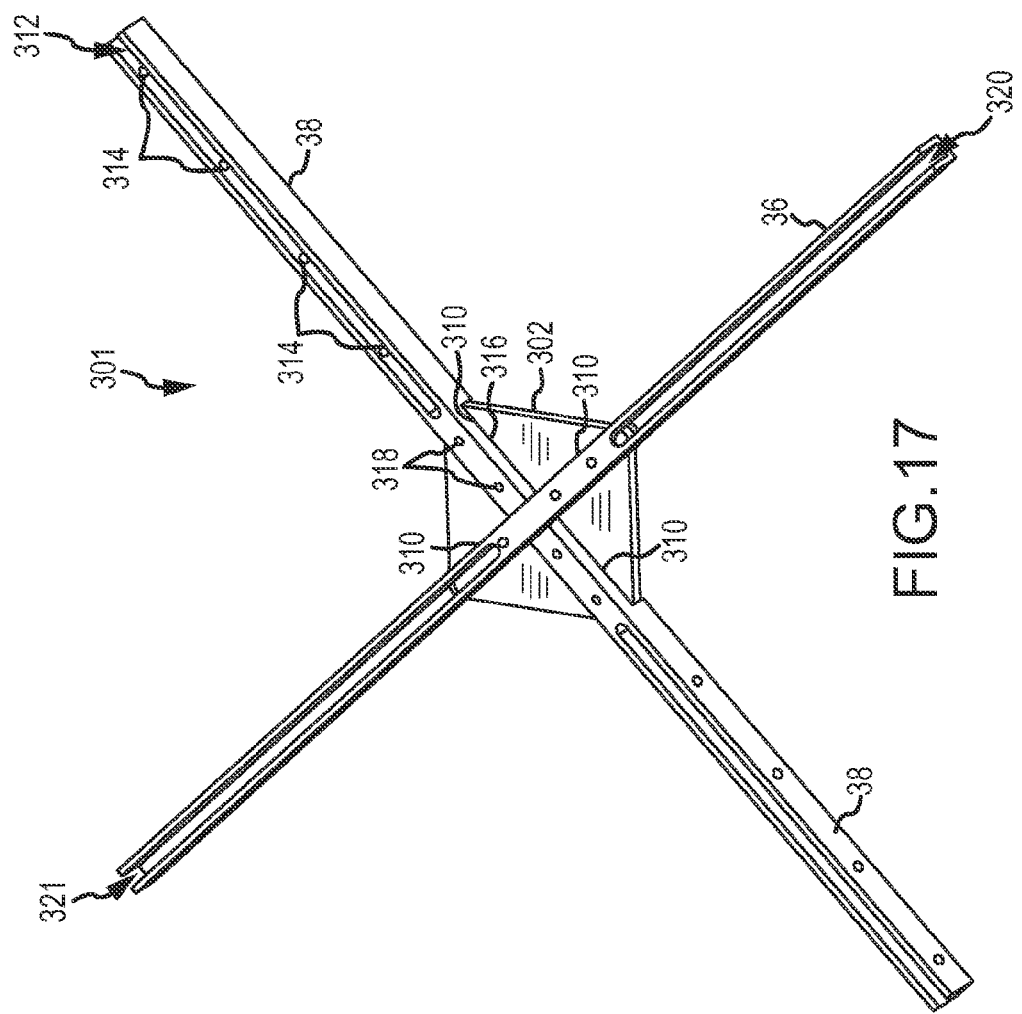

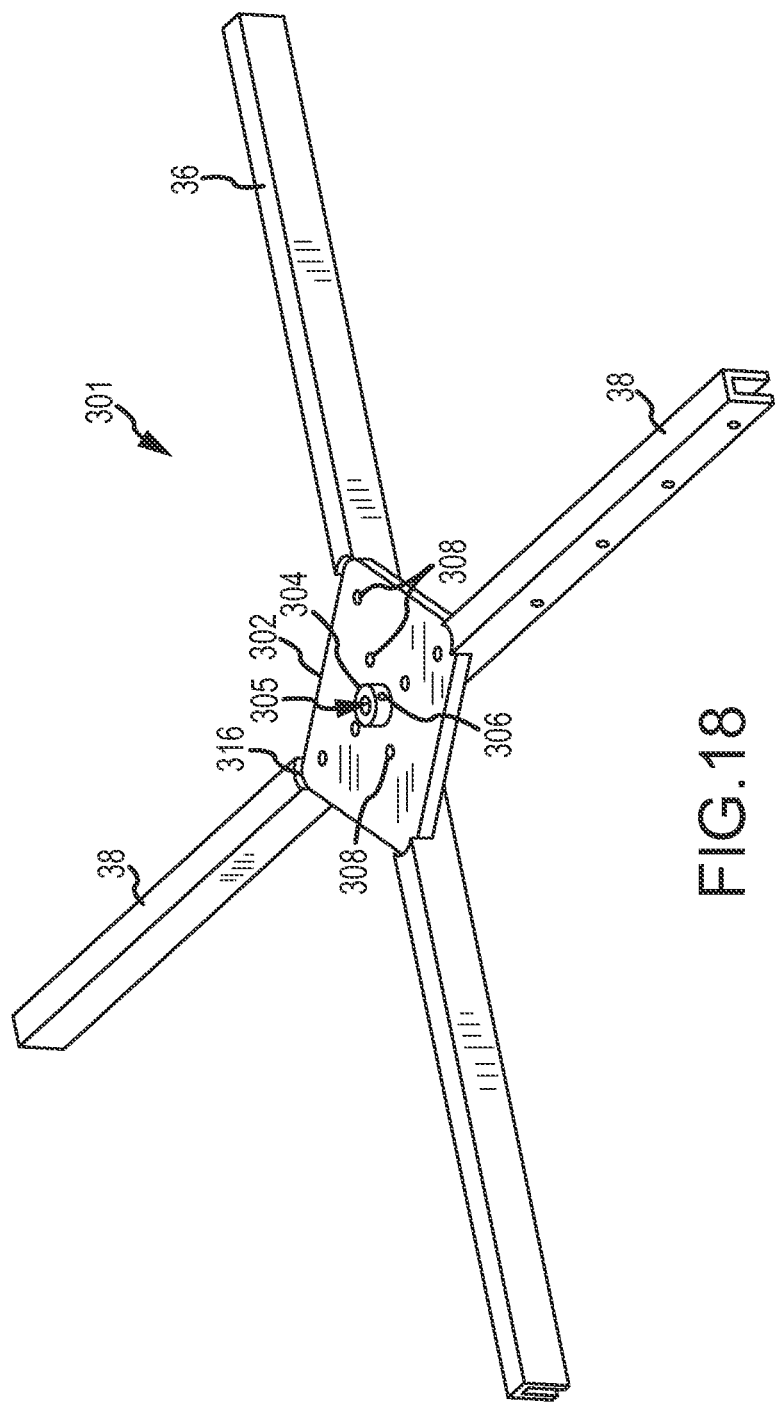

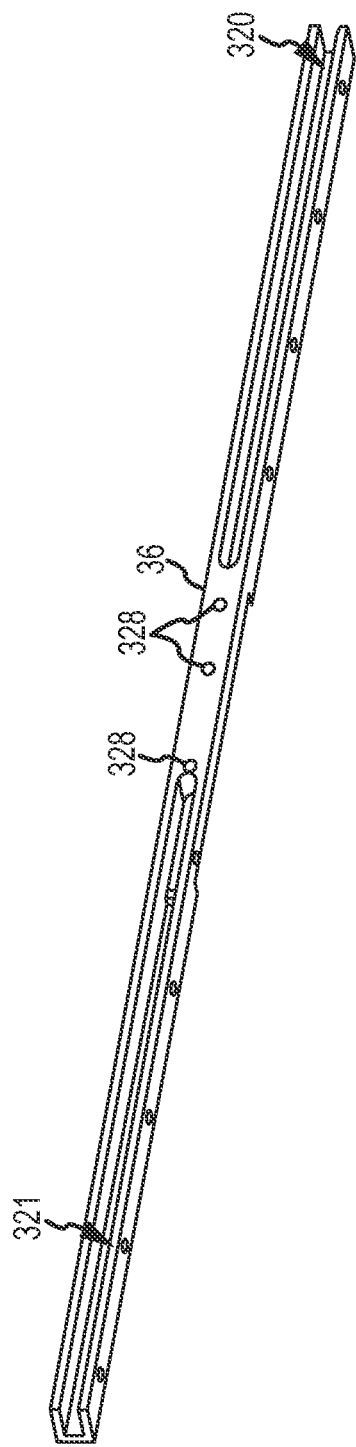

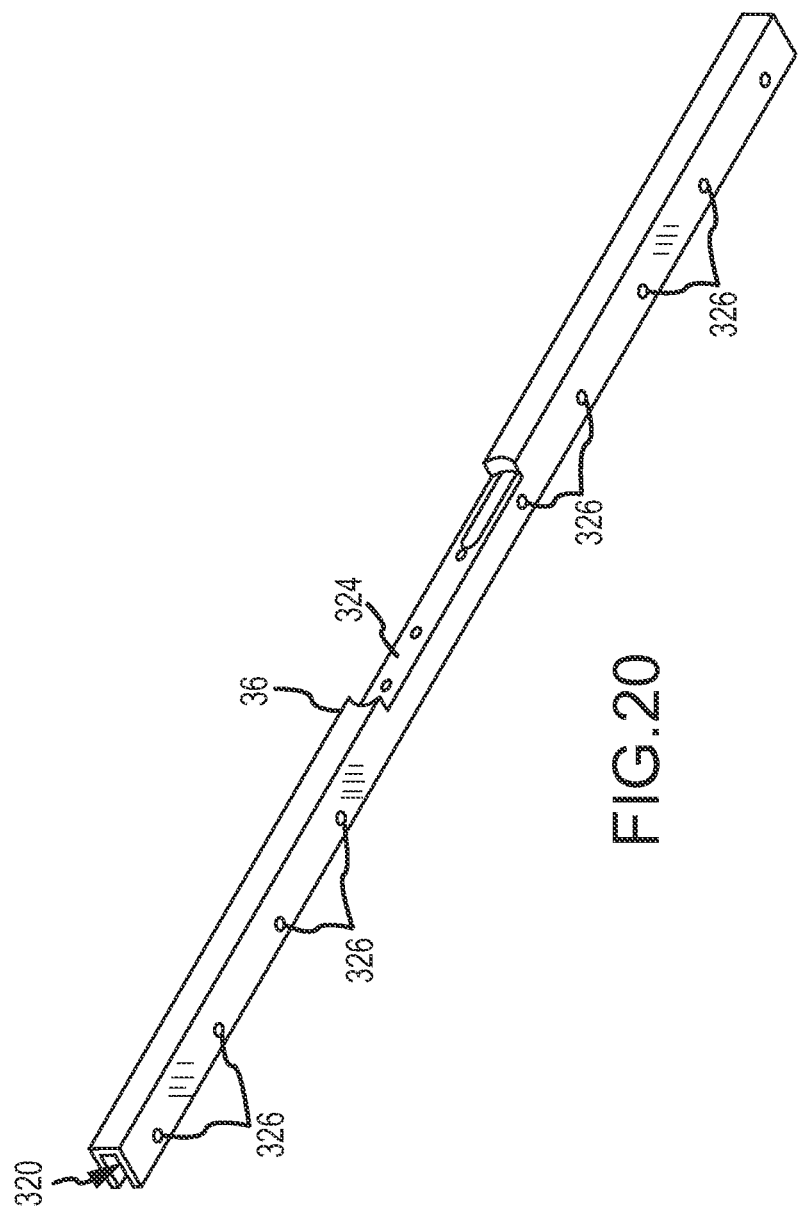

PLANT TRIMMING APPARATUS AND METHODS OF USING THE SAME

PRIORITY

The present application claims the benefit of International Patent Application No. PCT/US12/69845, filed Dec. 14, 2012, which claims the benefit of U.S. Provisional Patent Application Ser. No. 61/576,911, filed Dec. 16, 2011, titled PLANT TRIMMING APPARATUS AND METHODS OF USING THE SAME, the disclosures of each of which is incorporated herein as if set out in full.

BACKGROUND

In the production of economically desirable crops such as rosemary, oregano, mint, basil, parsley, flowers, and medicinal herbs, for example, various portions of the plant have different uses and corresponding values. Some portions of the plants are less desirable and constitute a byproduct of harvesting the more desirable portions of the plant. Therefore, it is necessary at some point in the crop production process to separate the plants into their various constituent parts.

Traditionally, harvested plants were hand trimmed and sorted into varying types and grades of product. Hand trimming is labor intensive and time consuming. As far back as the cotton gin, equipment has been developed to assist in harvesting plants. Similarly, various types of equipment have been developed to assist in trimming leaves and stems from harvested plants. However, these machines have certain drawbacks. For example, trimming machines exist that simply include a grate with a spinning blade positioned underneath. Such a trimming machine still requires an operator to move the plant around on the grate to remove the unwanted portions of the plant. This hand trimming technique is time consuming and requires an operator with special skill. Furthermore, if an operator inadvertently places their finger into the grate, the spinning blade can cause serious injury.

Automatic trimming equipment has been developed in an effort to provide safety and reduce the level of operator skill required to properly trim harvested plants. However, these devices still have room for improvement. For example, existing automatic trimming equipment has a tendency to damage or bruise the plant products. Also, existing equipment is not as effective as hand trimming and lack the adjustments necessary to effectively process various types and quality of plants. In addition, automatic harvesters are typically noisy and difficult to transport.

Accordingly, there is a need for equipment to address these and other aspects of plant harvesting. In specific instances, there is a need for an automatic harvester that is safe and more effective than traditional devices. Moreover, there is a need for a harvester that is portable, quiet, and adjustable.

SUMMARY

In an embodiment of the technology of the present application, the plant trimming apparatus comprises a container. The container may be a cylindrical drum or other container, preferably having a cylindrical region defined therein. A grate is supported within the container, wherein the grate includes openings sized and configured to selectively receive parts of a plant. A cutting blade is rotatably supported within the container adjacent the grate. A fan blade also is rotatably supported within the container.

The apparatus may further comprise a blade motor including a shaft, wherein the cutting blade and the fan blade are supported on the shaft. The cutting blade may include a plurality of forward or rear leaning blades that cooperate with the grate openings to cut parts off the plant. The leaning of the blades may be dependent in part on the desired trim output. The blade also may have an outer ring extending between each of the plurality of blades.

The container has a top end region and a bottom end region, wherein the fan blade is operative to create an air flow from the top end region to the bottom end region. The air flow may form a vortex and suction to facilitate movement of the plant. The container includes a discharge opening and may include a chute attachable to the container proximate the discharge opening. In one aspect, the apparatus may further comprise one or more collection containers. In one exemplary embodiment, thereof, the collection container may include a primary collection bag attached to a bottom rim portion of the container, wherein the primary collection bag comprises a first material having a first mesh size. In another exemplary embodiment, a secondary collection bag may be attached proximate the bottom rim portion of the container that is comprised of a second mesh size smaller than the first mesh size. In still another exemplary embodiment, a tertiary collection bag also may be attached proximate the bottom rim portion of the container that has a mesh size smaller than the second mesh size. In other embodiments, still additional collection bags may be beneficial. Also, in one or more embodiments, a vacuum system may be connectable to facilitate drawing the plant parts through the various collection containers.

The grate may include a plurality of elongate slots each having a coved, scalloped, beveled, gradient shaped edge, or the like, which edges may be generically referred to as an "eased edge". In one particular embodiment, the grate has a thickness and the eased edge may extend approximately halfway through the thickness. In another particular embodiment, the eased edge may extend approximately 80-90% through the thickness. In still another particular embodiment, the eased edge may extend approximately 85% through the thickness. The plurality of elongate slots may be arranged in a pattern, such as, for example, a circular or spiral pattern.

In one aspect, the apparatus may further comprise at least one agitator arm rotatably disposed within the container above the grate. The apparatus further comprise an agitator motor, wherein the at least one agitator arm is connected to the agitator motor. Each agitator arm includes a plurality of flexible fingers extending toward the grate. The flexible fingers may be comprised of silicone sheet or other resilient material, for example.

The plant trimming apparatus may further comprise a lid assembly attached to an upper rim portion. The lid assembly includes at least one panel, such as a door, vent, shutter, or the like, movable between an open state and a closed state. The fan blade creates a vortex within the container and the vortex configuration changes between the open and closed states.

In another aspect of the technology, the plant trimming apparatus comprises a cylindrical container having a top end region and a bottom end region and a grate supported within the container. A cutting blade is rotatably supported within the container adjacent the grate. A fan blade is rotatably supported within the container, wherein the fan blade is operative to create an air flow from the top end region to the bottom end region, which may form a vortex in certain air flow configurations. At least one agitator arm is rotatably disposed within the container above the grate and a lid assembly is attached to an upper rim portion of the container. The apparatus may further comprise an agitator motor disposed on the lid assembly, wherein the at least one agitator arm is connected to the agitator motor.

In yet another aspect of the technology, the plant trimming apparatus comprises a cylindrical container and a grate supported within the container. A cutting blade is rotatably supported within the container adjacent the grate and a fan blade is rotatably supported within the container. A primary collection bag is attached to a bottom rim portion of the container that comprises a first material having a first mesh size. A secondary collection bag is attached proximate the bottom rim portion of the container that is comprised of a second material having a second mesh size smaller than the first mesh size. The plant trimming apparatus may further comprise a tertiary collection bag that is attached proximate the bottom rim portion of the container, wherein the tertiary collection bag comprises a third material having a third mesh size smaller than the second mesh size.

Also contemplated herein are methods of trimming a plant. In one aspect of the technology, the method of trimming a plant comprises placing a plant on an upper surface of a grate. An agitator arm moves a plurality of fingers and a fan causes airflow, which may form a vortex. The combination of the airflow and the fingers moving about the upper surface of the grate, move the plant about the upper surface such that selected portions of the plant are received through the grate. The selected portions of the plant are cut off with a rotating blade that is positioned adjacent a lower surface of the grate. The airflow moves from the upper surface of the grate toward the lower surface of the grate and the selected portions cut from the plant are collected in a collection bag. Moving the plant about the surface and cutting the selected portions off the plant generates plant pieces of various sizes and selected plant pieces of a first size may be collected in a first collection bag. The method may further comprise collecting selected plant pieces of a second size in a second collection bag and selected plant pieces of a third size in a third collection bag. In other aspects, the method may include still further collection bags as well as a vacuum system to facilitate movement of the plant parts through the collection containers. The plurality of fingers is rotated about the grate in a first direction and may be subsequently rotated in a second direction.

The foregoing and other features, utilities, and advantages of the portable harvester and methods of using the same will be apparent from the following more particular description of the exemplary embodiments as illustrated in the accompanying drawings.

BRIEF DESCRIPTION OF THE DRAWINGS

The accompanying drawings, which are incorporated in and constitute a part of this specification, illustrate embodiments of a portable harvester and together with the description, serve to explain the principles and operation thereof. Like items in the drawings are generally referred to using the same numerical reference.

FIG. 17 is a bottom perspective view of the rotor assembly shown in FIG. 16;

FIG. 18 is a top perspective view of the rotor assembly shown in FIG. 16;

FIG. 19 is a bottom perspective view of the agitator arm bar shown in FIG. 18;

FIG. 20 is a top perspective view of the agitator bar shown in FIG. 18;

DETAILED DESCRIPTION

Described herein is a portable harvester that automates the trimming and harvesting of plants into constituent parts. While described herein with respect to certain exemplary embodiments, one of ordinary skill in the art will recognize that the technology described herein has other possible uses. Moreover, the embodiments described here are exemplary and should not be considered limiting.

Figure 1:
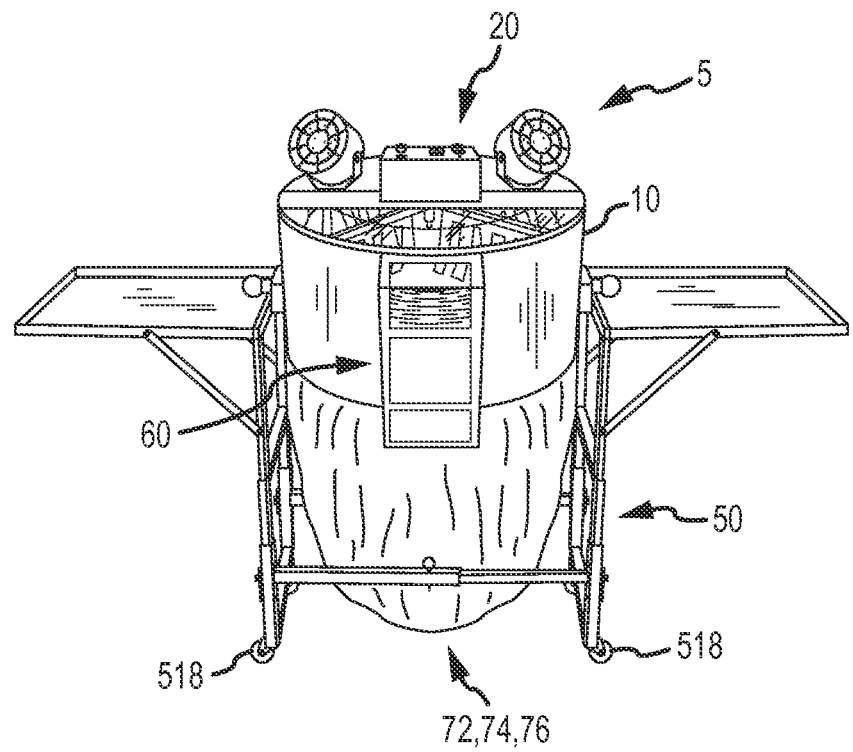
FIG. 1 is a perspective view of a plant trimming apparatus according to an exemplary embodiment.
Figure 32:
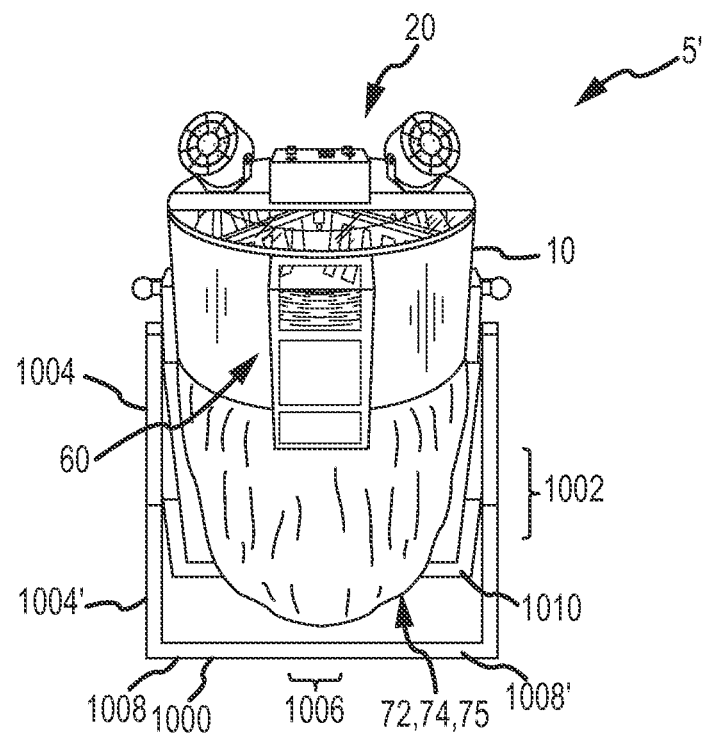
FIG. 32 is a perspective view of a plant trimming apparatus according to an exemplary embodiment.
Figure 33:
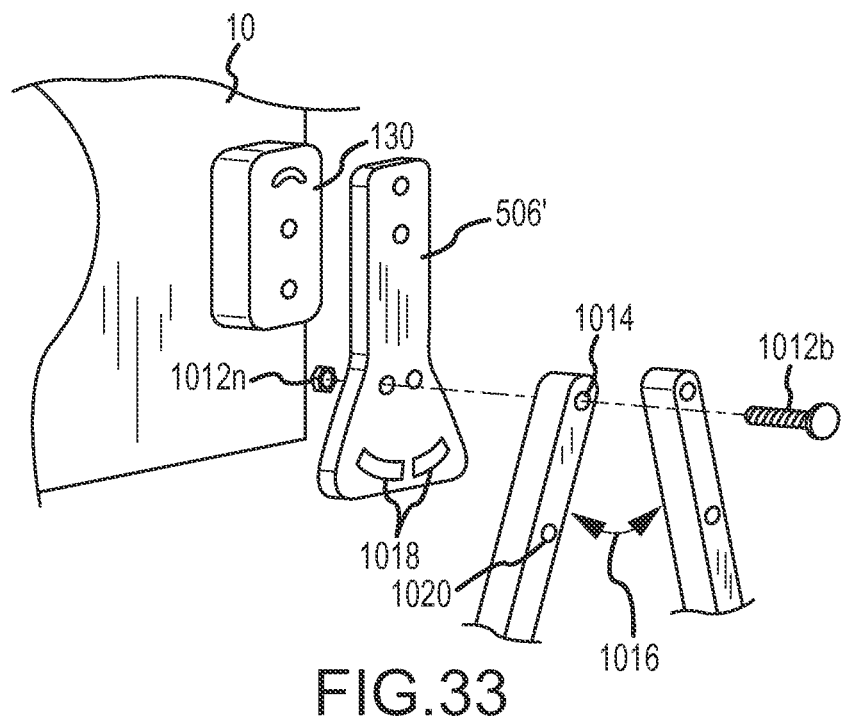
FIG. 33 is an exploded view of a portion of the plant trimming apparatus according to FIG. 32.

FIG. 1 illustrates a plant trimming apparatus according to an exemplary embodiment. FIGS. 32 and 33, explained further below, illustrates an alternative plant trimming apparatus. Many of the parts for the plant trimming apparatus shown in FIG. 1 and FIG. 32 are the same, and will only be described in connection with FIG. 1.

Plant trimming apparatus 5 includes a container assembly 10 which is covered by a lid assembly 20. Also attached to container assembly 10 is a chute assembly 60. The container assembly 10 is supported on a collapsible frame assembly 50. Container assembly 10 supports a plurality of filter bags 72, 74, and 76 to receive the product. The collapsible frame assembly 50 is provided on a plurality of casters 518 to facilitate local movement of the apparatus 5.

Figure 2:
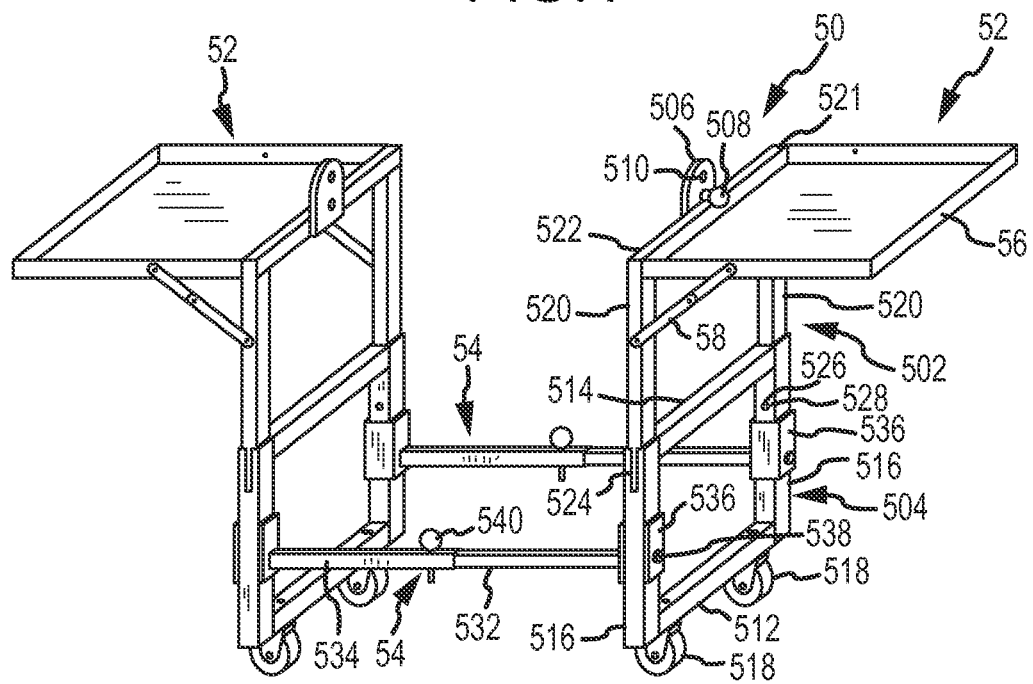
FIG. 2 is a perspective view of the support stand shown in FIG. 1.

With further reference to FIG. 2, it can be appreciated that the collapsible frame assembly 50 is constructed so that it may be disassembled and collapsed into a smaller space in order to facilitate transporting the plant trimming apparatus 5. Collapsible frame assembly 50 is comprised of a pair of side support frames 52 which are symmetrical such that they can be used on either the right or left side of the collapsible frame assembly 50. Side support frame 52 includes an upper frame portion 502 and a lower frame portion 504. Upper frame portion 502 is comprised of a pair of legs 520 which are joined by cross member 522. The pair of legs 520 and cross member 522 may be connected using any conventional means, such as, for example, the legs 520 and cross members 522 may be hollow tubular members that receive protrusions from an elbow joint or the like. Cross member 522 supports a tray 56. Tray 56 is attached to cross member 522 with a hinge 521, such as a piano hinge, and is supported in an upright position with a pair of folding braces 58. Lower frame portion 504 is comprised of a pair of legs 516 that are connected by cross members 514 and 512, and which correspond to the pair of legs 520. Legs 516 are, in this case, tubular such that they may receive legs 520 of the upper frame portion 502. Legs 516 each include a slot 524. Slot 524 is sized to cooperatively engage the washer and bolt connecting brace 58 to upper legs 520 to allow the legs 520 to telescope with the legs 516. Each leg 516 also includes an aperture 528 which is operative to receive a detent 526. Accordingly, when assembled, the pair of legs 520 of the upper frame portion 502 are inserted into lower frame portion 504 pair of legs 516 until detent 526 engages aperture 528. The detent 526 may be spring loaded as is conventional to allow assembly and disassembly of the upper and lower frame portions 502, 504. Also shown in the figures, lower frame cross member 512 has a pair of casters 518 attached thereto.

Side support frames 52 are connected together by cross member assemblies 54. Each cross member assembly 54 includes a tube member 534 that is hollow to receive the opposite member 532 therein. The members 534 and 532 are fastened together by pin 540, whereby members 532 and 534 may be disassembled. In the alternative, pin 540 acts like a hinge such that the cross member 54 can be folded in half. Rather than complete disassembly, the members 532 and 534 may telescope from a portable to a displayed position where the pin 540 acts as a snap button. Both members 532 and 534 include a bracket 536 which engages the corresponding leg 516 of lower frame portion 504. Bracket 536 also includes a detent 538 which engages an aperture (not shown) formed in leg 516. Alternatively, the bracket 536 is bolted to the corresponding leg 516 of the lower frame portion 504.

Collapsible frame assembly 50 is capable of being disassembled and collapsed into an area approximately the same size as tray 56. For example, tray 56 may be folded against upper side frame 502 by collapsing or folding the folding braces 58. Also, the upper frame portion 502 may be removed from lower frame portion 504 and stacked. The cross members 54 may be disassembled, telescoped together, or folded to effectively shorten their length. The various components of the collapsible frame assembly 50 may be connected with various techniques as are known in the art, such as with fasteners or by welding the tubes together. The side frames 52 and cross members 54 may be comprised of any suitable tube-type material, such as aluminum tubing, steel tubing, sheet metal, composites, plastics, or and the like.

Figure 3:
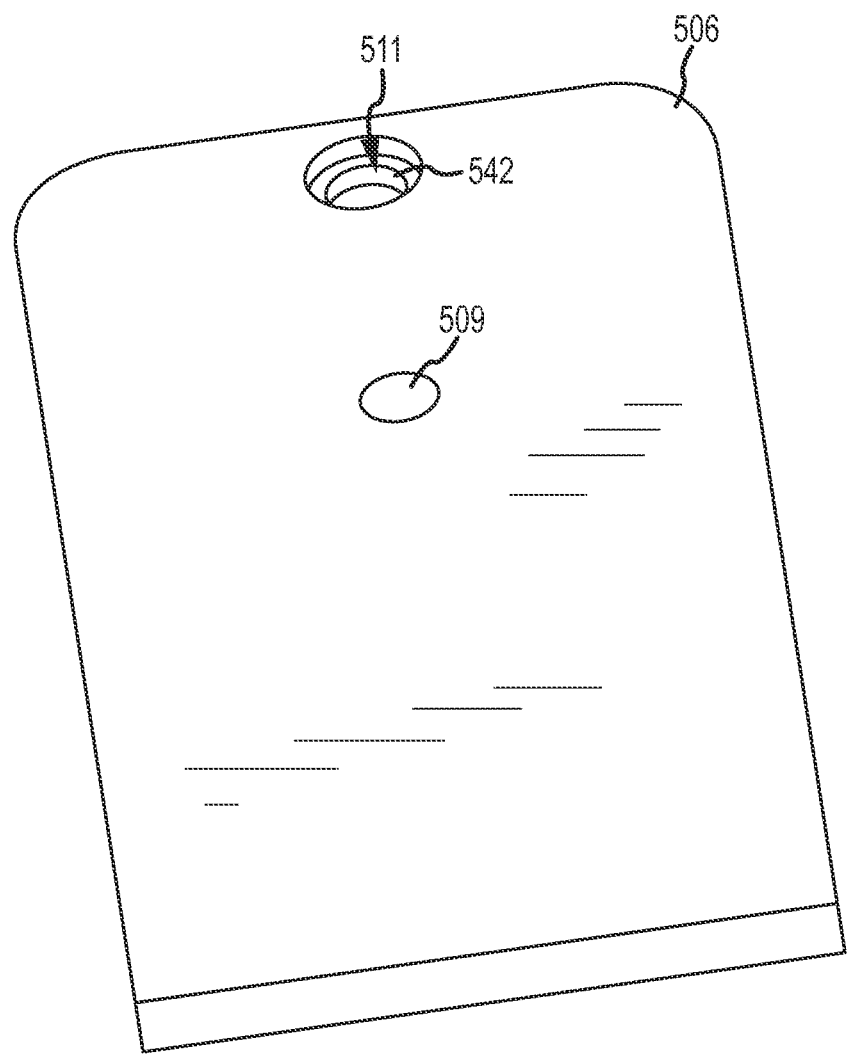
FIG. 3 is a perspective view of a container mount shown in FIG. 2.
Figure 7:
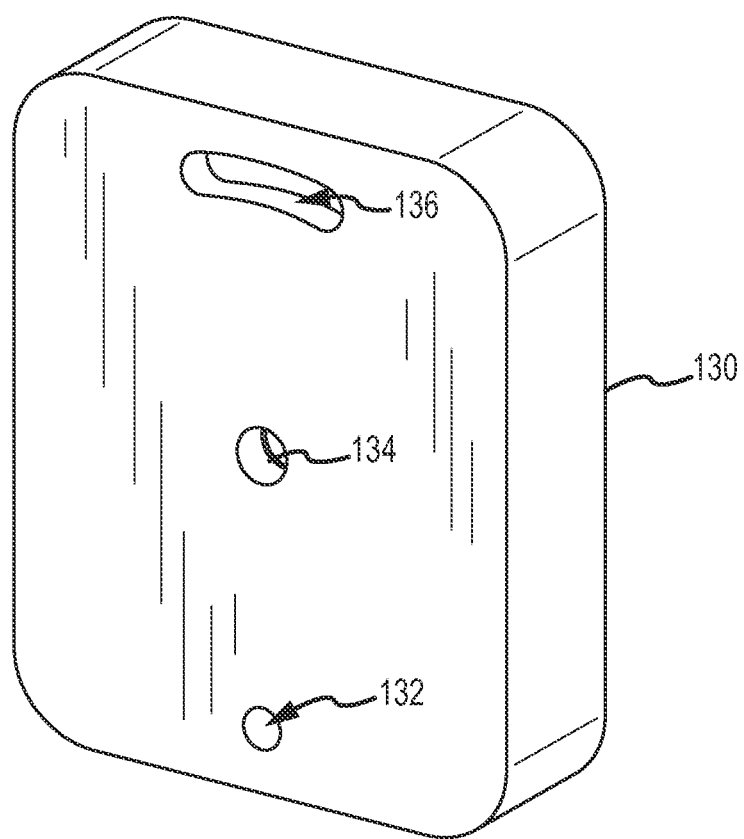
FIG. 7 is a front side perspective view of the drum mount.
Figure 8:
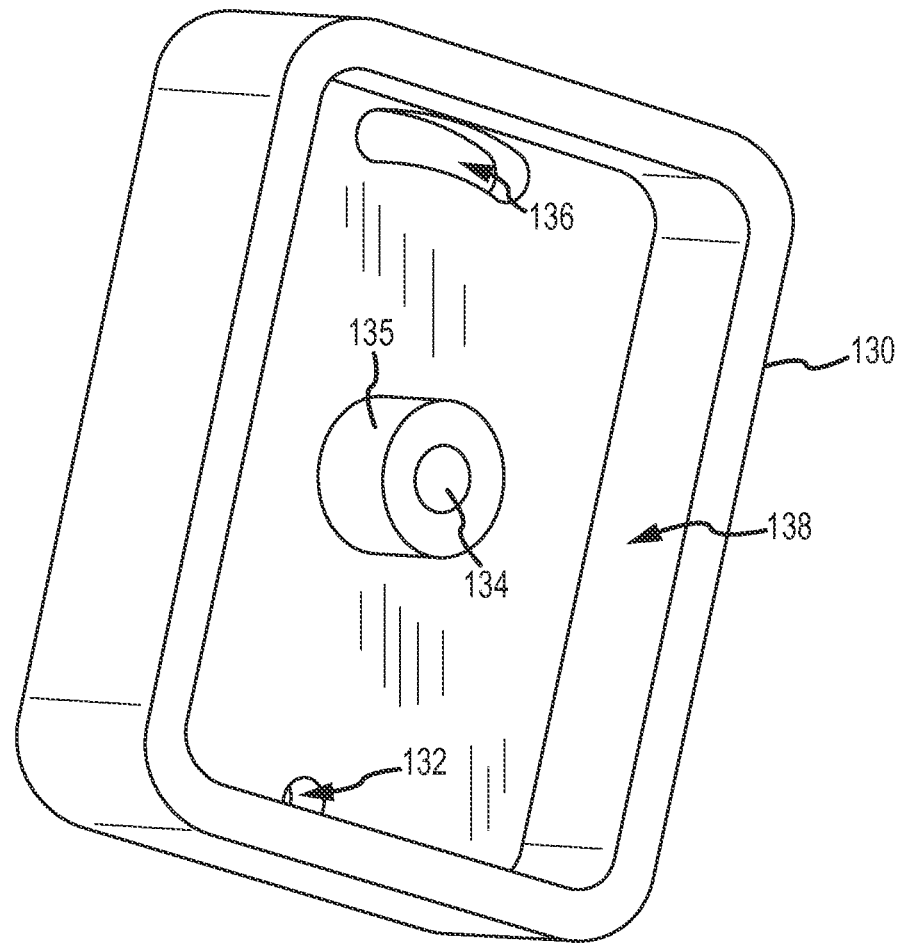
FIG. 8 is a back side perspective view of the drum mount.

A container mount 506 is attached to each of the cross members 522 of upper frame portion 502. Container mount 506 includes an attachment knob 508 as well as a detent pin 510. The mounting of container assembly 10 to collapsible frame assembly 50 will be described in more detail below. Container mount 506 is, in this case, welded or bolted to cross member 522 of upper frame 502. When mounted using bolts, container mount 506 may include additional threaded bolt holes to facilitate the connection to the collapsible frame assembly 50. With reference to FIG. 3, it can be appreciated that mount 506 is comprised of a sheet or plate material, such as aluminum. Container mount 506 includes a hole 509 that receives the attachment knob 508, which subsequently is operatively connected to drum mount 130 as shown in FIGS. 7 and 8 below. Container mount 506 also includes a countersunk hole 511 which includes counter bore 542. The hole is drilled 511 and counter bore (542) are configured to operatively receive the detent pin 510. Counter bore 511 is configured to receive a detent pin 510. Detent pin 510 is commonly available, and an exemplary detent is available from SouthCo. Such detent pin 510 may be spring loaded such that the pin is retracted manually. In certain embodiments, the detent pin 510 may be maintained in the open position by rotating the knob, such as by 90 degrees. Reversing the rotation releases the detent pin.

Figure 4:
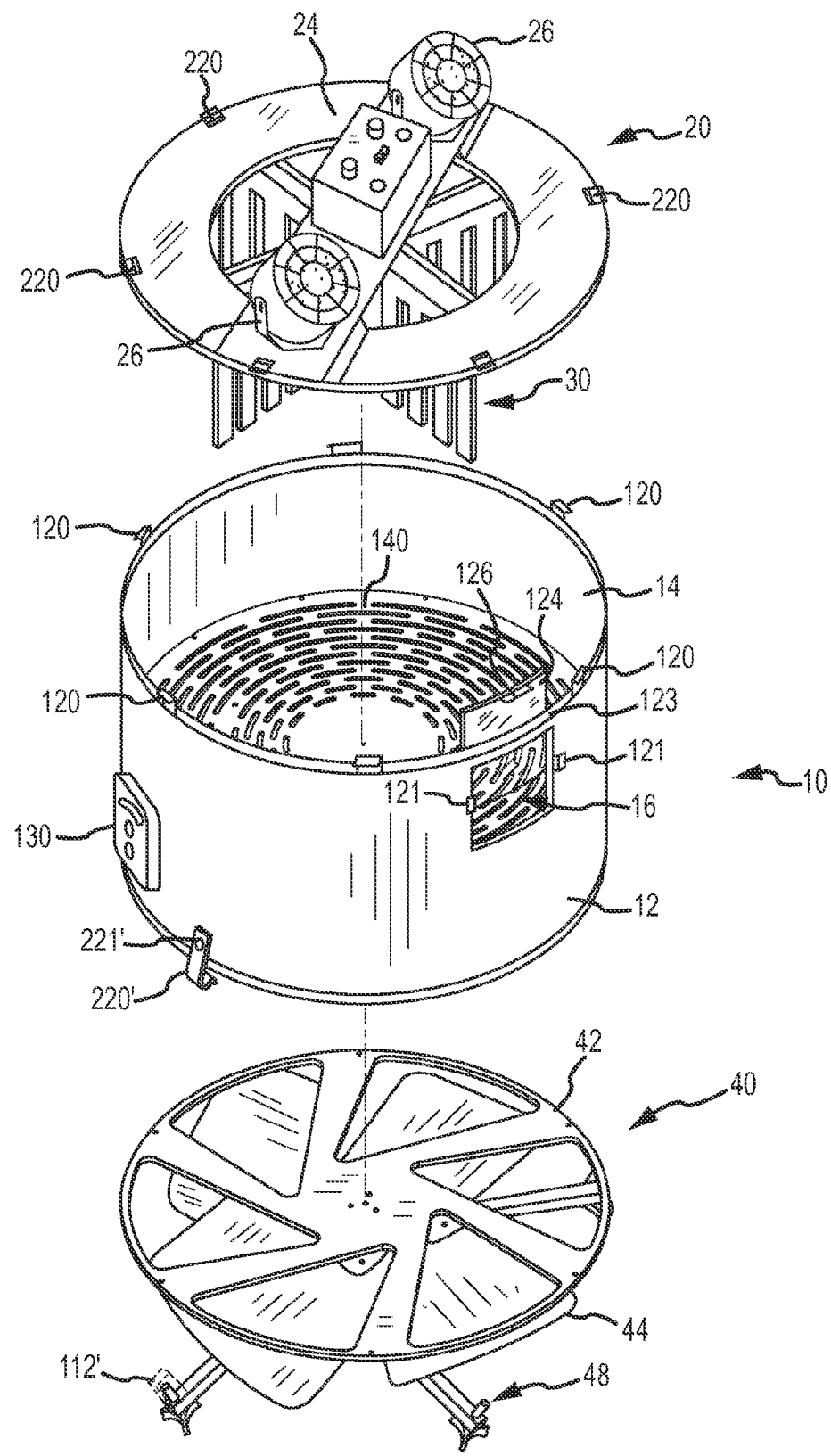
FIG. 4 is an exploded perspective view of the container assembly, lid assembly, and fan blade assembly.

As shown in FIG. 4, plant trimming apparatus 5 includes container assembly 10 that comprises a container 12 having an interior. In this case, the container 12 is in the form of a cylindrical drum. An inner support drum ring 14 is attached on the inside of drum 12 that supports grate 140 and A lid assembly 20, which are explained further below. Inner support drum ring 14 also provides a slide way 123 for sliding door 124. Sliding door 124 is installed adjacent to opening 16 in the side wall of container 12. The inner support drum ring 14 may be in certain exemplary embodiments formed of a rubber, such as neoprene, with a liner, such as an aluminum sheet. When formed of rubber, the ends may be clamped and bolted with plates.

The lid assembly 20 is removably attached to the container 12 by a plurality of latches 220 that are configured to engage a plurality of mating hooks 120 which are attached to container 12. Lid assembly 20 also rotationally supports an agitator assembly 30. The agitator assembly 30 rotates within the container to assist in turning the plants therein as will be described herein. Lid assembly 20 includes a motor control unit 24 as well as an optional pair of speakers 26. Motor controller 24 optionally includes a media player device or mount, which may be connected to a personal music device.

Container assembly 10 also has a motor fan blade assembly 40 that supports a fan motor, a fan, and a blade that is installed opposite lid assembly 20. The motor fan blade assembly 40 includes a mounting arm 48. Mounting arm 48 supports a motor, (not shown in FIG. 4), a fan blade 44, and a cutting blade 42. Container assembly 10, along with lid assembly 20 and fan blade assembly 40, are all supported on support stand 50 via a pair of container mounts 130 secured to the side of container 12 that cooperatively engages the container mounts 506.

As will be explained further below, the mounting arms 48 may include a motor fan blade assembly mount 112' as shown in phantom, which will be explained further below. When motor fan blade assembly mount 112' is used, the container 12 may have a latch, such as a conventional link lock latch 220' that terminates in a movable hook 120'. The motor fan blade assembly mount 112' is slidably connected to a button 221' that extends into a channel on the motor fan blade assembly mount 112' as will be explained further below.

Figure 5:
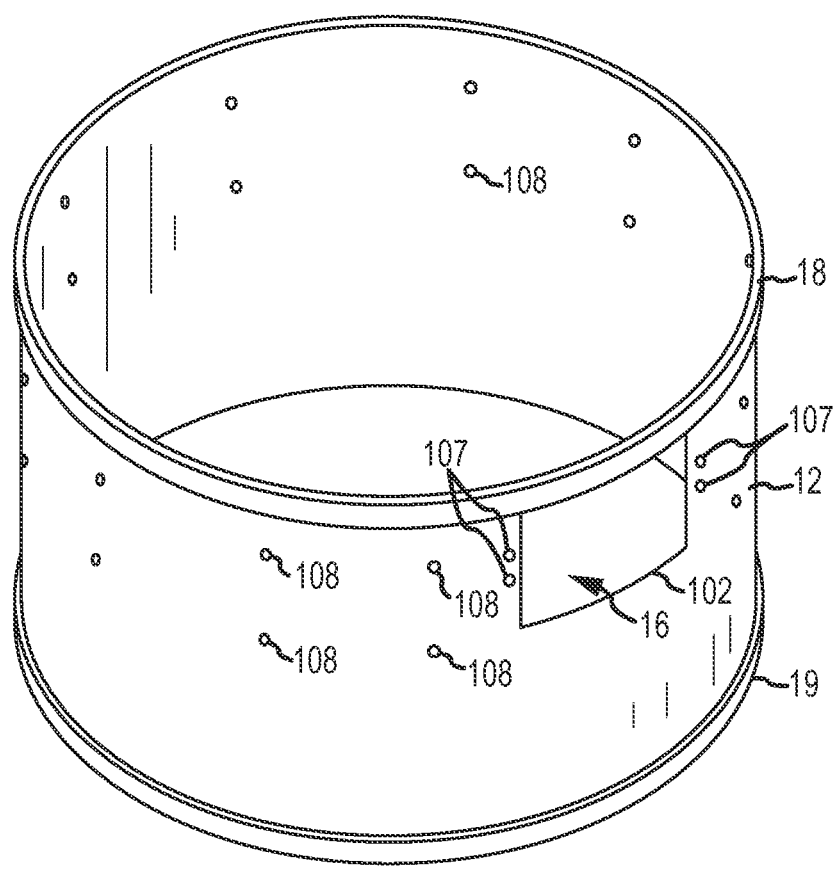
FIG. 5 is a perspective view of a drum.
Figure 6:
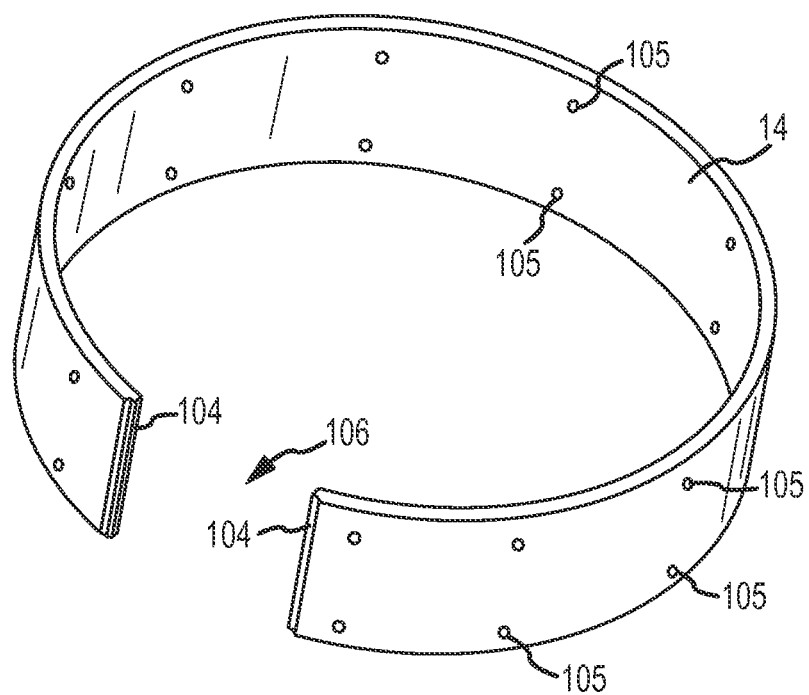
FIG. 6 is a perspective view of the inner drum ring of the container assembly.

With further reference to FIG. 5, container 12 is shown as a cylindrical drum having an upper rim 18 and a lower rim 19. The upper and lower rims 18, 19 may be hemmed extensions of the wall of container 12. An opening 16 is formed inside the wall of container 12 adjacent to upper rim 18. A plurality of apertures 108 are formed through an upper margin of container 12 to receive fasteners for securing the inner support drum ring 14 to the inside of container 12. A pair of apertures 107 are disposed on either side of opening 16 to attach hooks 121. Hooks 121 are in turn used to attach chute assembly 60. Also, referring to FIG. 6, it can be appreciated that inner support drum ring 14 may include(s) a plurality of holes 105, which may be threaded depending on the connection device used, to mate or align with apertures 108. Accordingly, inner support drum ring 14 may be secured to the inside of container 12 with a plurality of suitable fasteners, such as pins, rivets, screws, or the like. Also shown in FIG. 6 is slide way 104 may be cut or otherwise formed in inner support drum ring 14. If cut, the inner support drum ring 14 may be provided such that the inner support drum ring 14 has opposing ends. Inner support drum ring 14 includes a gap 106 that aligns with opening 16 formed through container 12. When inner support drum ring 14 is installed, notches 104 on the opposite ends of the inner support drum ring 14 form slide ways in which door 124 is installed. Alternatively, one or more tracks such as an aluminum channel may be coupled to the opposing ends of the gap in inner support drum ring 14 to receive the door 124. Accordingly, via a handle 126, which is shown as a tab monolithic with the door and operatively centered, door 124 may be moved up and down as desired in order to allow product to exit the interior of container 10 through chute assembly 60. While shown using vertical motion, the door 124 may move horizontally in which case one of the notches would provide a passage way to receive the door 124.

Container assembly mounts 130 may be comprised of either a sheet metal bracket or, as in this case, a billet-machined piece welded to the sides of container 12. With reference to FIGS. 7 and 8, each container mount 130 includes a threaded hole 134 disposed approximately in the center of the container mount 130. Threaded hole 134 is configured to receive a threaded end portion of attachment knob 508. Alternatively to a threaded connection, the container mount may be provided with a quick disconnect, which are generally known in the industry. Container mount 130 also includes an arcuate slot 136, as well as an opposed aperture 132. Both aperture 132 and slot 136 are sized to receive detent pin 510. Slot 136 allows some rotational movement of container assembly 10 with respect to collapsible frame assembly 50. Aperture 132 allows the container assembly 10 to be rotated 180 degrees and then locked in position. It is contemplated that slot 136 would be used to receive the detent pin 510 when the container assembly 10 is in the normal upright position. The slot 136 allows some adjustment in angle as necessary to provide the desired performance of the plant trimming apparatus 5, but limits its ability to flip over completely for safety purposes. It also is contemplated that aperture 132 will be engaged by detent 510 for maintenance and cleaning operations of the fan blade assembly 40. As shown in FIG. 8, mount 130 may be hollowed out to create cavity 138 that extends around threaded hole 134, thereby creating a boss 135 on the interior or backside of mount 130.

Figure 9:
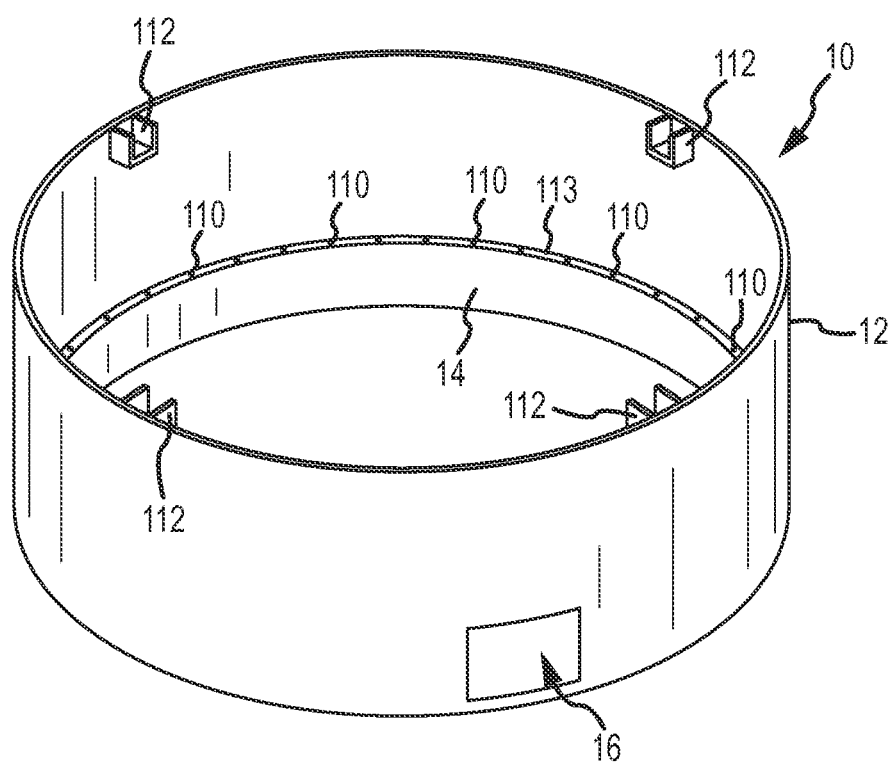
FIG. 9 is a perspective view of the container assembly as viewed from underneath.

As shown in FIG. 9, the container assembly 10 is viewed from below to illustrate the installation of inner support drum ring 14 to container 12, which may be referred to as the outer container. The inference to inner and outer are relative terms for convenience and should not be considered limiting. The inner support drum ring 14 includes a mounting surface 113, that may have a plurality of threaded holes 110 depending on the material used to construct inner support drum ring 14. A grate 140 support (shown in FIG. 10) is attached via multiple fasteners to inner support ring 14 adjacent to mounting surface 113. Accordingly, grate 140 includes a plurality of apertures 142, which may be keyed slots, that align with mounting holes 110 if mounting holes 110 are available. Otherwise, for example, if the inner support drum ring 14 does not have mounting holes as it is made from rubber, apertures 142 are aligned with the mounting surface in no particular arrangement. The apertures 142 may be keyed slots to allow for removal of the grate without completely unscrewing, for example, the fasteners. In other words, grate 140 is mounted to inner support ring 14 from below. Also FIG. 9 also shows a plurality of motor fan blade assembly mounts 112. When optional motor fan blade assembly mounts 112' are used, motor fan blade assembly mounts 112 would be replaced by link lock latch 220' and button 221' shown in FIG. 4, but not specifically shown in FIG. 9.

Figure 10:
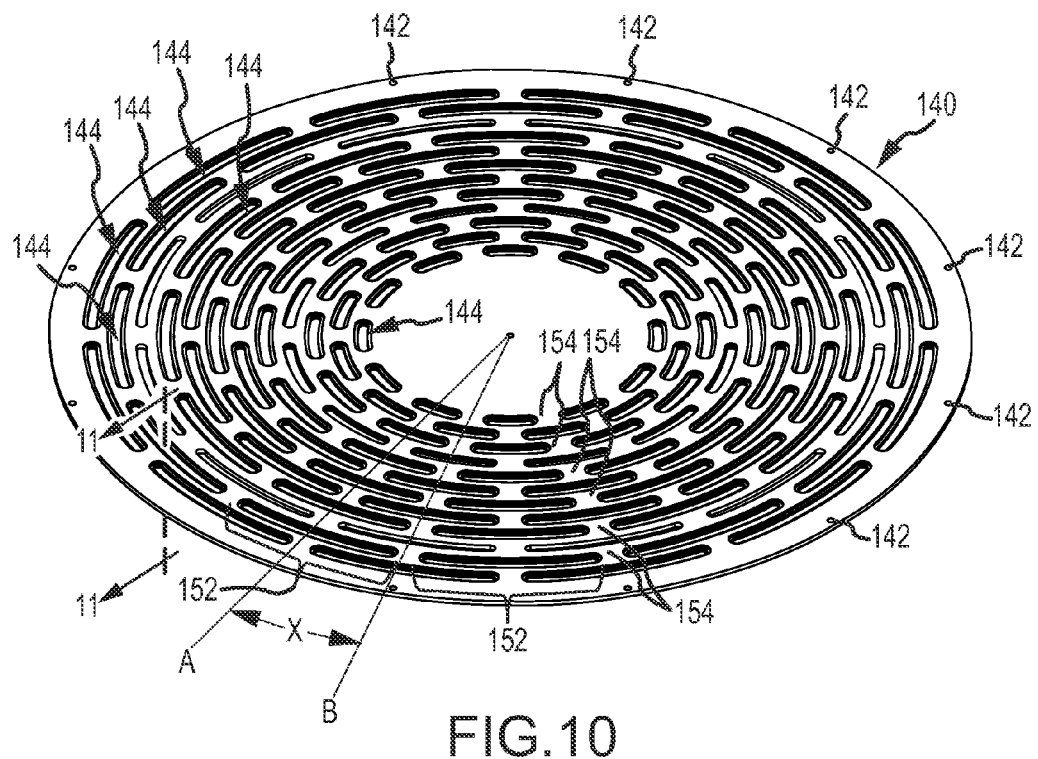
FIG. 10 is a perspective view of the grate.
Figure 11:
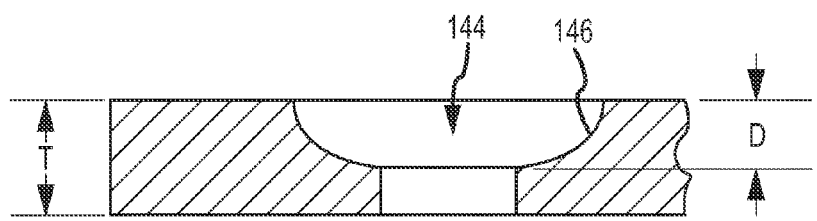
FIG. 11 is a partial cross-section of the slots illustrating the coved radius.

With further reference to FIG. 10, the grate 140 may includes a plurality of apertures 142 that mate with mounting holes 110. Grate 140 includes a plurality of slots 144 arranged in a pattern, such as, for example, a circular or spiral pattern although other patterns are possible. In this case, the circular pattern is comprised of a first circular pattern A which is interlaced and offset with a second pattern B. In this embodiment, pattern A and pattern B are offset by an angle X. Each pattern A and B is comprised of a plurality of sections 152. Each section 152 is comprised of a plurality of slots arranged as rows 154. Pattern B is similarly arranged in sections 152, comprising a plurality of slots arranged in rows 154; however, pattern B is offset by angle X and is interlaced between the slots of pattern A as shown. With reference to FIG. 11, grate 140 is comprised of a plate of, in this case, aluminum, having a thickness T. As can be appreciated in FIG. 11, each slot 144 includes a cove radius 146 to form an eased edge. Alternatively, the slot 144 may be scalloped, form a gradient, or the like all of which are generically referred to as an eased edge. As shown in this case, cove radius 146 extends into plate 140 a distance D. In this case, distance D is approximately one-half of thickness T. In other embodiments, the distance D may comprise up to approximately 80 to 90% of the thickness T. In still other embodiments, the distance D may comprise approximately 85% of the thickness T. It has been found by the inventors that eased edge as described herein and above is helpful in facilitating the proper trimming of plant products.

Figure 12:
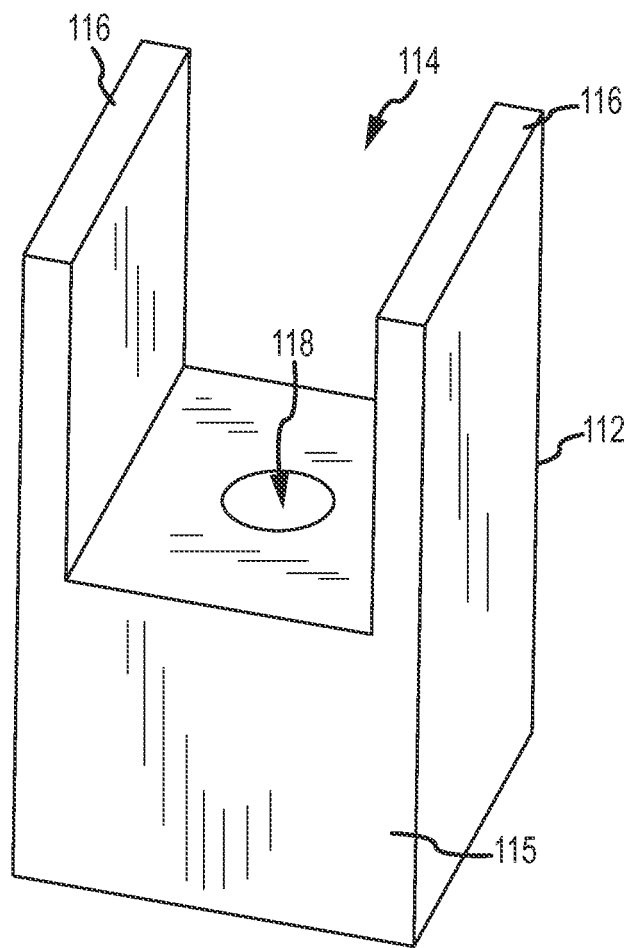
FIG. 12 is a view of the motor fan blade assembly mount shown in FIG. 9.

Motor fan blade assembly mount 112 includes a pair of walls 116 extending substantially in parallel upwardly from body portion 115 as shown in FIG. 12. When using the motor fan blade assembly mount 112, the body portion 115 includes a threaded hole 118 for attaching the fan blade assembly 40. Between side walls 116 is a gap 114 that guides the fan blade assembly 40 with respect to threaded hole 118. Motor fan blade assembly mounts 112 are, in this case, welded to the inside of drum 12, equally spaced from each other. As shown, four mounts are placed at 90°s, although more or less mounts are possible. Typically, the mounts are symmetrically located.

Figure 12A:
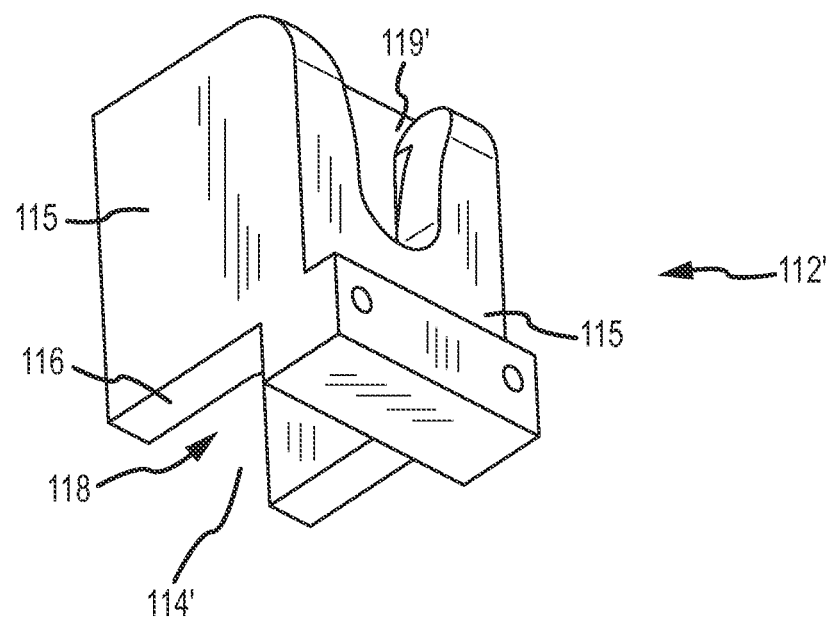
FIG. 12A is a view of the motor fan blade assembly mount shown in FIG. 4

Rather than motor fan blade assembly mounts 112, the mounts alternatively may be replaced by motor fan blade assembly mount 112' shown in FIG. 12A. Motor fan blade assembly mount 112' is similar to motor fan blade assembly mount 112, and includes the body portion 115 having the threaded hole 118 for attaching to the fan blade assembly. The side walls 116 form a channel or recess gap 114' having a body extension 115' such that the recess gap 114' is not a through gap such as gap 114. The body portion 115 includes a sleeve 119' operatively sized to receive the button 221' extending into container 12 from latch 220'. The opening of sleeved channel 119' may be flared or tapered to facilitate alignment. The fan blade assembly mount 112' is bolted to mounting arms 48, as shown in FIG. 4.

Figure 13:
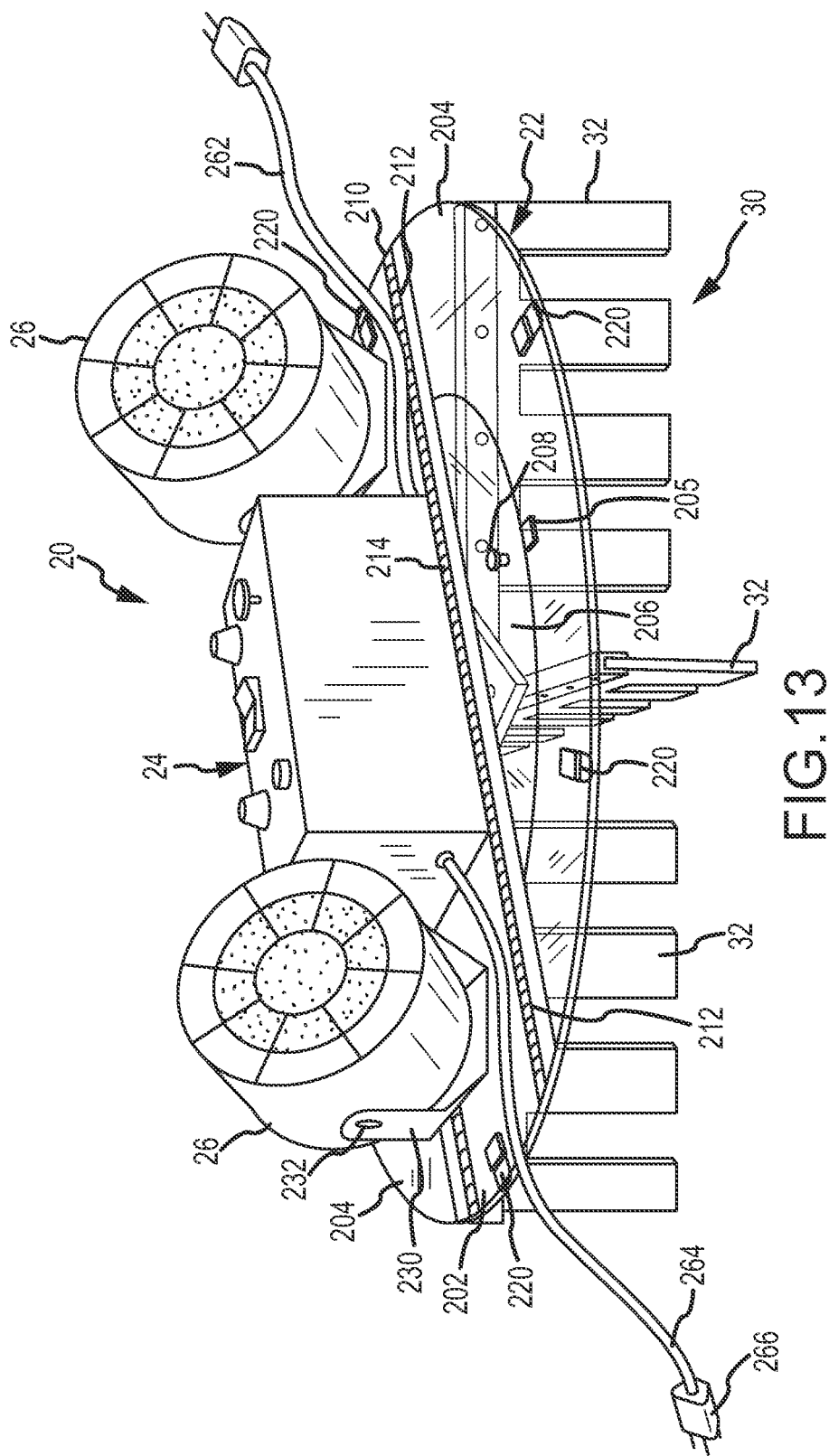
FIG. 13 is a perspective view of the lid assembly and agitator assembly.

As shown in FIG. 13, lid assembly 20 includes a central mounting plate 202. Disposed in approximately the center of central mounting plate 202 is a motor control unit 24. On either side of motor control unit 24 is an optional speaker 26 that is mounted to the central support 202 via a bracket 230. Each speaker 26 may be is gimbaled on bracket 230 with pins 232 or, as an alternative, with a bolt and nyloc nut on one side, and a bolt and wing-nut on the other side of each speaker. Attached to central portion 202 is a pair of covers 22. Each cover 22 is comprised of an outer lid 204 and an inner lid 206 although alternative arrangements are possible including more or less lids as well as different configurations. In this exemplary embodiment, inner lid 206 is nested within outer lid 204. As shown, both the outer and inner lids 204, 206 are hinged to the central mounting plate 202. The hinge 210, in this case, is a piano hinge which has been segmented into an inner hinge portion 214 and a pair of outer hinge portions 212. Accordingly, the inner lid 206 may be opened independent of the outer lid 204. Also, both the inner and outer lids 204, 206 may be opened at the same time. Inner lid 206 includes a handle 208 usable to open the inner lid 206. Handle 208 may include a magnet which is operative to adhere to the motor control unit 24, thereby holding it in an open position. In certain aspects, inner lid 206 may includes a tab 205 that acts as a stop for the inner lid 206. In other aspects, the inner lid 206 outer edge and the outer lid 204 inner edge are milled to overlap to provide a stop. The lid assembly 20 is attached to container assembly 10 by a plurality of latches 220.

Figure 14:
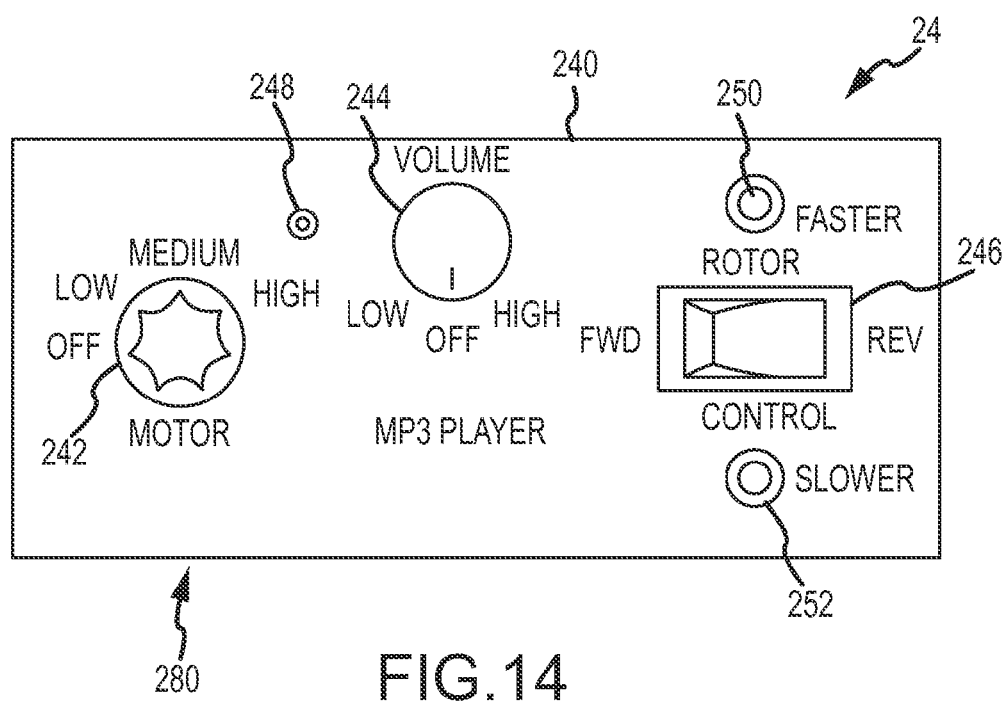
FIG. 14 is a top plan view of the motor control module.

With continued reference to FIG. 14, motor control unit 24 includes an enclosure 240 that houses a gear motor 280 (not shown). Gear motor 280 is housed in enclosure 240 and supports agitator assembly 30 that hangs below the lid assembly 20. In this embodiment, gear motor 280 is a reversible, 12 volt DC, parallel shaft, gear motor with a 270:1 gear ratio and an RPM range of 0 to 30, although other RPM ranges are usable.

Agitator assembly 30 is supported by the shaft of gear motor 280 below the lid assembly 20 and within the container 12 of the container assembly 10. Motor control unit 24 includes a plurality of controls. The agitator motor 280 is controlled by toggle switch 246 that includes a central off position as well as forward and reverse positions. The speed of agitator motor 280 may be adjusted faster or slower by depressing button 250 to increase speed or button 252 to decrease the speed. Accordingly, the agitator rotation direction and speed may be controlled as desired. Other controls are possible such as a graphical user interface using, for example, a touch screen or a wireless interface to a smartphone or the like also are possible. The fan blade and cutting blade motor (which is described more fully below) is controlled by knob 242 that includes low, medium, and high speed settings as well as an off position. Alternative motors may provide a variable speed control from a low (which may be off) to a high speed setting rather than discrete option. In this case, in the middle of the control unit enclosure 240 is a volume knob 244 which is used to control the volume of music that is played through speakers 26. The control unit also includes a one-eighth inch jack 248 or a wireless connection such as, for example, Wi-Fi, Bluetooth, or the like, that interfaces with a standard headphone, which may include a connector or wireless interface from a portable media device, such as an iPod, Smartphone, MP3 device, or the like. Returning to FIG. 13, the motor control unit 24 includes a power cable 262 which includes a standard plug for 115 volt AC power. The control unit 24 also includes cable 264 and a connector 266 which connects with the fan and blade assembly motor. Other safety features may be available such as fuses, switches, circuit breakers, or the like.

Figure 15:
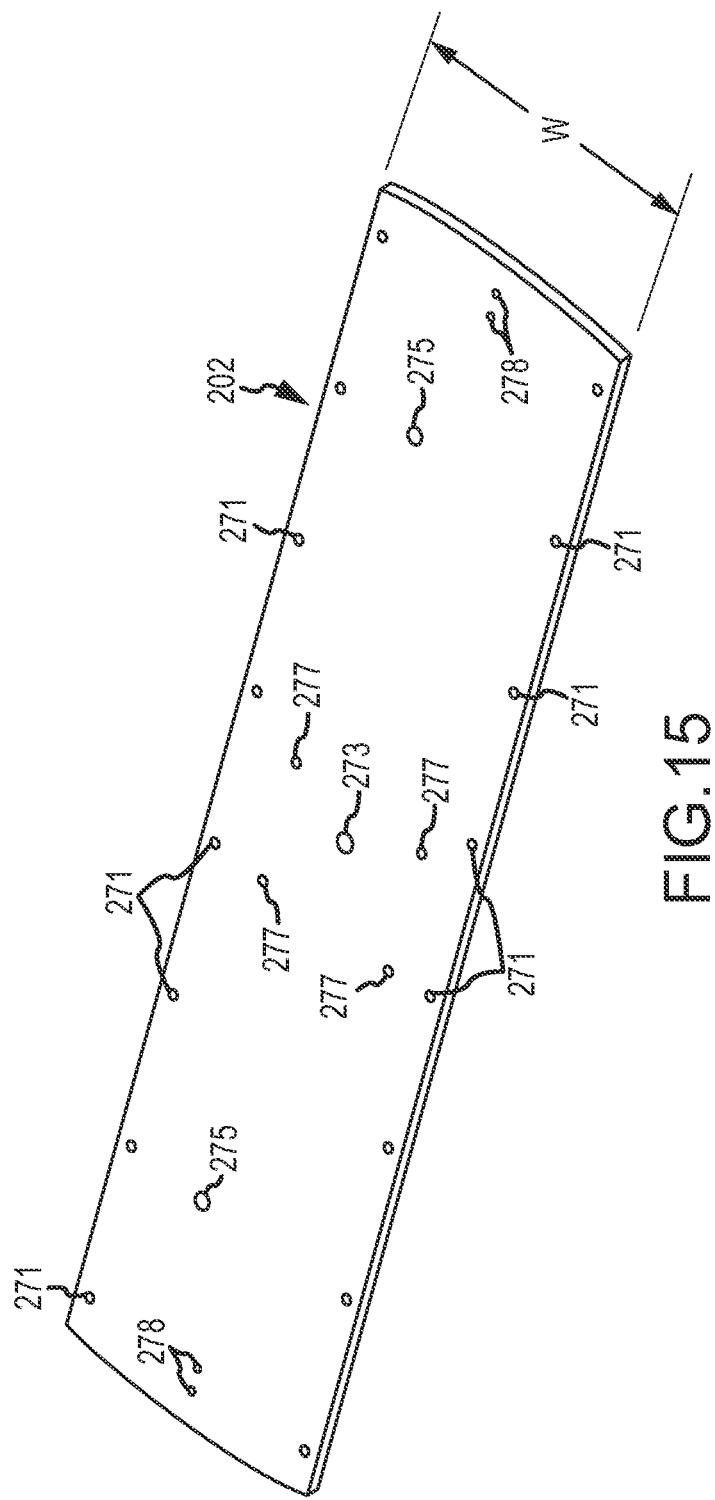
FIG. 15 is a perspective view of the lid assembly central mounting plate.

As shown in FIG. 15, the control mounting plate 202 has a width W that is approximately one-tenth to one-third, but preferably closer to one-fifth, the diameter of the container assembly 10. Central mounting plate 202 includes a plurality of mounting holes 271 to which the piano hinges 210 are attached. The central mounting plate 202 also includes a plurality of apertures 278 to which the latches 220 may be attached. Also, approximately in the center of central mounting plate 202 is a motor clearance hole 273 which receives the shaft from gear motor 280. The motor control unit 24 is attached to central plate 202 using mounting holes 277, and the optional speakers 26 may be mounted to the central mounting plate 202 at holes 275.

Figure 16:
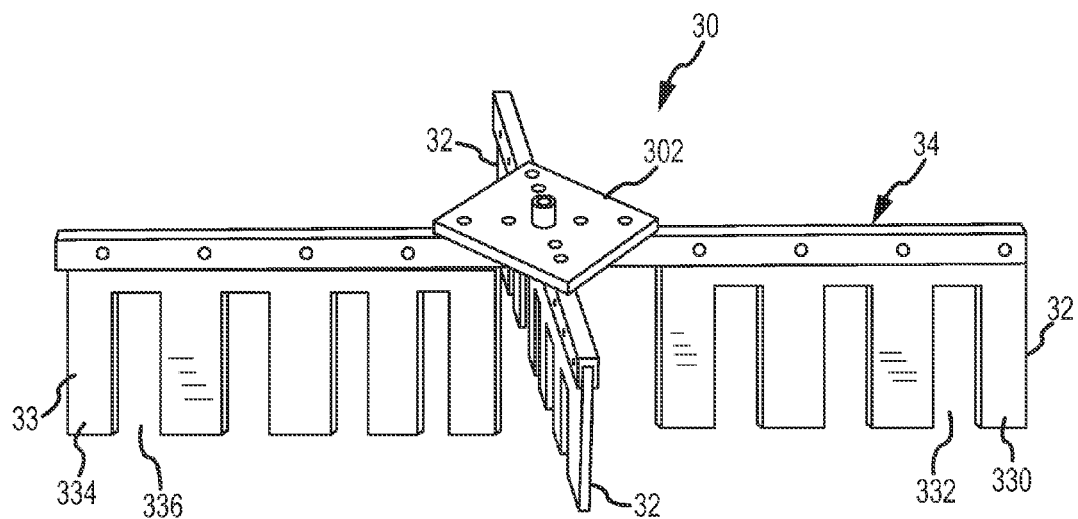
FIG. 16 is a perspective view of the agitator assembly.

As shown in FIG. 16, agitator assembly 30 includes a plurality of agitator arms 34 extending from mounting plate 302. In this case, there are four agitator arms equidistantly spaced apart. While only four agitator arms are shown in this case, fewer or more agitator arms may be used. In this embodiment, three of the four agitator arms support a finger array 32. Finger array 32 includes three slots 332 thereby forming four fingers 330. Finger array 33 includes a plurality of fingers 334, in this case five fingers, which again may be formed by cutting slots 336 to form the finger array 33. The additional finger on finger array 33 is positioned near the center of the hub. This extra finger is operative to help ensure that plant product is not stranded in the middle of grate 140. In certain embodiments, however, the agitator arms all comprise the same slot 332 such that the same finger arrays may be used, such as the case where more, thinner closer fingers are provided.

Figure 16A:
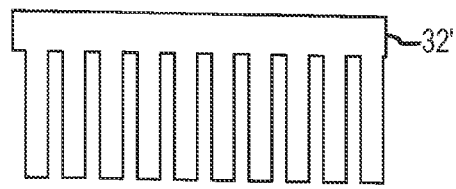
FIG. 16A is a view of the finger assemblies of FIG. 16.

Finger arrays 32 and 33 are comprised of a flexible material such as silicone sheet material. Alternative materials include, for example, leathers, rubbers, and the like. While four or five fingers with three or four spaces are shown in the exemplary embodiment, other arrangements may be possible depending on the plant being harvested. In particular, in one embodiment, the plurality of agitator arms 34 support the same finger arrays 32. Moreover, while the fingers or the arrays 32 and 33 are shown with relatively wide fingers separated by relatively wide slots, it has been found providing more, thinner fingers and slots facilitates airflow and decreases bruising and other damage to the plants, such fingers for example, may be approximately 0.75 cm to 1.25 cm width fingers separated by approximately the same size gap. An exemplary finger array 32' having more, thinner fingers and slots is shown in FIG. 16A.

Agitator assembly 30 includes a rotor assembly 301 which supports the plurality of finger arrays 32 and 33 on arms 34. As shown in FIGS. 17 and 18, rotor assembly 301 includes a hub 302 supporting arm bar 38 and arm bar 36. The arm bars 38 and 36 form the plurality of arms 34 shown in FIG. 16. The arm bar 38 includes slots 312 on opposite sides that are sized and configured to receive a finger array 32. Arm bar 36 includes two slots on opposite sides of a different configuration. Slot 320 is sized and configured to receive a finger array 32 and is similar to slot 312, while slot 321 is sized and configured to receive the longer five-fingered finger array 33. Arm bar 38 includes a plurality of threaded apertures 314 that are configured to receive a fastener, which may be a screw threaded into a threaded hole to retain the finger array therein. With reference to both FIGS. 17 and 18, arm bar 38 includes a notched portion 316 which mates with a groove 310 formed in mounting plate 302. Arm bar 38 also includes a pair of threaded apertures 318 for attaching the arm bar to mounting plate 302 through apertures 308. As shown in FIG. 18, mounting plate 302 includes a plurality of mounting holes 308 through which fasteners may be installed to attach respective arm bars 36, 38 thereto. Mounting plate 302 also includes boss 304 through which is formed an aperture 305 that is sized and adapted to receive a shaft of gear motor 280. The rotor assembly 301 is secured to the rotor motor shaft by a set screw installed in aperture 306 on boss 304. Arm bar 36 is shown in FIGS. 19 and 20. As mentioned above, arm bar 36 includes two slots 320 and 321. Arm bar 36 also includes a countersink portion 324 (similar to notch 316) which mates with a corresponding slot 310 formed in mounting plate 302. Similar to arm bars 38, arm bar 36 includes a plurality of threaded apertures 326 into which fasteners are installed in order to retain finger arrays in their respective slots. Arm bar 36 also includes a plurality of mounting holes 328 to facilitate attachment of the arm bar 36 to mounting plate 302. It should be noted that one of the mounting holes 328 is omitted to accommodate the longer length of finger array 33 which, in this embodiment, includes five fingers. While the finger arrays are described herein with a particular number of fingers, any number of fingers may be used as desired. Preferably, however, at least one finger should be positioned near the center of the hub in order to prevent the accumulation of plant product in the center of the grate 140.

Figure 21:
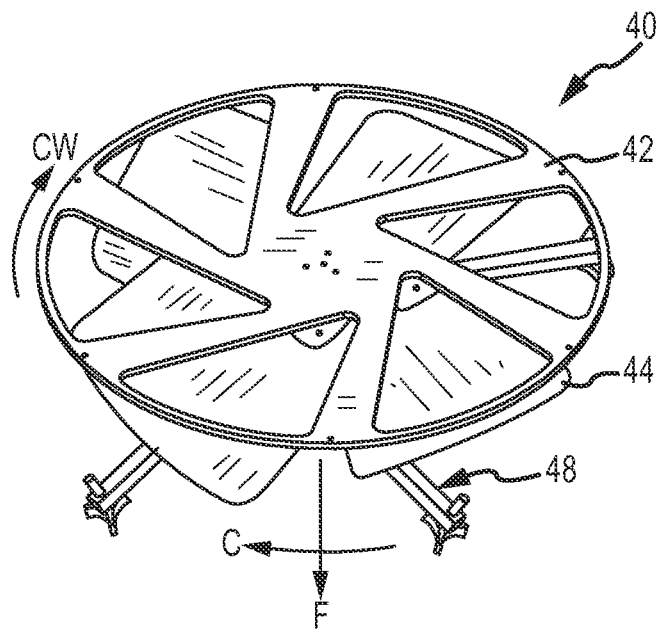
FIG. 21 is a perspective view of the fan and blade assembly shown in FIG. 4.
Figure 22:
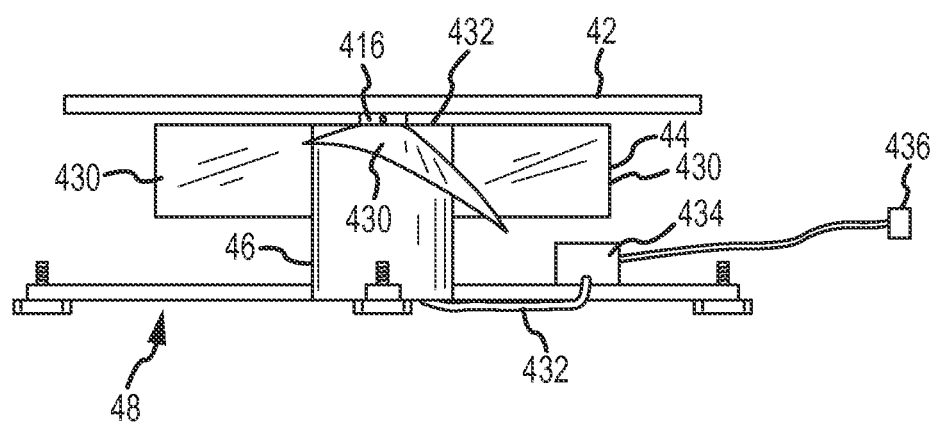
FIG. 22 is a side view in elevation of the fan and blade assembly shown in FIG. 21.

As shown in FIG. 21, the fan blade assembly 40 includes a fan 44 and a cutting blade 42 which are disposed on motor 46. Motor 46, in turn, is mounted on mounting arms 48. As can be appreciated in FIGS. 21 and 22, for example, both the blade and the fan are configured to rotate in a clockwise fashion such that the air flow F and C from fan 44 is both downward and circular. As shown in FIG. 22, motor 46 is mounted on mounting arms 48, while fan 44 is attached to motor 46 between the motor 46 and cutting blade 42. A cable 432 extends from motor 46 to terminate in a suitable connector 436 which interfaces with connector 266 of control module 24. A Capacitor 434 is operatively connected between the motor 46 and the connector 266 and mounted to mounting arms 48. Fan 44 is comprised of a plurality of fan blades 430 which are configured such that clockwise rotation of the blade creates a downward-directed air flow F. Although the fan is shown, in this case, to blow downward when rotated in a clockwise direction, the blade 42 and fan blade 44 may be reversed such that counterclockwise rotation creates a downward flow. In this embodiment, motor 46 is a 115 volt AC, ¾ HP direct drive blower motor capable of 1075 RPM although different motors are possible including motors operable for other electrical grid protocols, such as, for example, a 22V motor for use in Europe.

Figure 23:
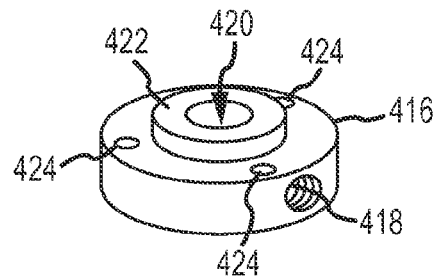
FIG. 23 is an enlarged perspective view of the mounting hub shown in FIG. 22.

With reference to FIG. 23, cutting blade 42 is attached to the motor shaft by a hub 416. Hub 416 includes a central aperture 420 configured to fit on the motor shaft. Aperture 420 is intersected by two threaded set screw holes 418. Surrounding central aperture 420 is a boss 422 which acts as a centering pilot for the cutting blade 42. A plurality of threaded mounting holes 424 are disposed around the boss 422 at equidistant spacing. Fan 44 may be attached to the shaft with a similar hub. Fan 44 includes a plurality of fan blades 430 which extend from a hub portion 432.

Figure 24:
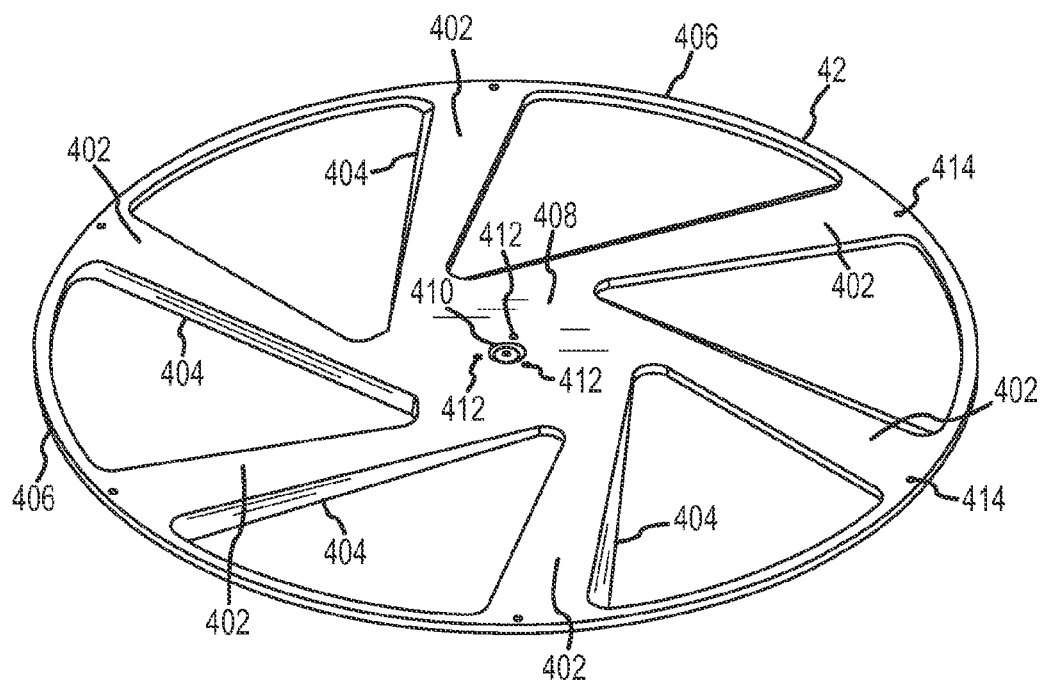
FIG. 24 is a bottom perspective view of the cutting blade.

FIG. 24 shows cutting blade 42 as viewed from underneath. Cutting blade 42 is comprised of a central portion 408 from which extend a plurality of blades 402. Blades 402 extend from the hub 408 and are angled toward the direction of rotation, in this case clockwise. The leading edge of each blade 402 is angled to create a sharp edge 404 as shown. The leading edge of the blade 402 may be the longer or shorter side of the blade 42 depending on whether the cutting edge is forward or rear leaning. In the center of hub region 408 is a countersink 410 that mates with boss 422 of hub 416. Accordingly, there is a plurality of mounting holes 412 that mate with mounting holes 424 on hub 416. Also shown in FIG. 24 is an outer rim portion 406 that extends between the ends of blades 402. Rim portion 406 includes a plurality of holes 414 which may be used to facilitate manufacturing the blade. In this case, cutting blade 42 is comprised of aluminum plate which has been machined by a milling process, for example. While the blade is formed from aluminum in this case, other materials such as stainless steel or steel may be used. Although cutting blade 42 includes six cutting blades in this embodiment, more or fewer cutting blades may be used. It should be appreciated that the leaning angle of blades 402 cooperate with the slots 144 of grate 140 to create a scissor action in trimming the plant product. The leaning angle of blades 402 may be forward leaning or rearward leaning.

Figure 25:
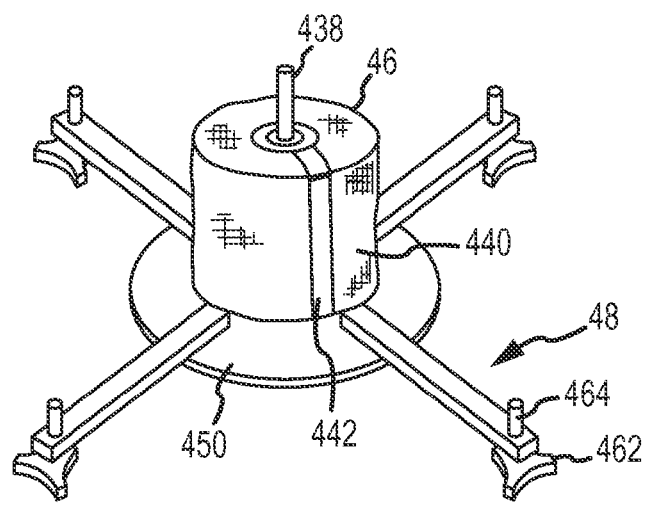
FIG. 25 is a partial perspective view of the motor mount assembly.
Figure 26:
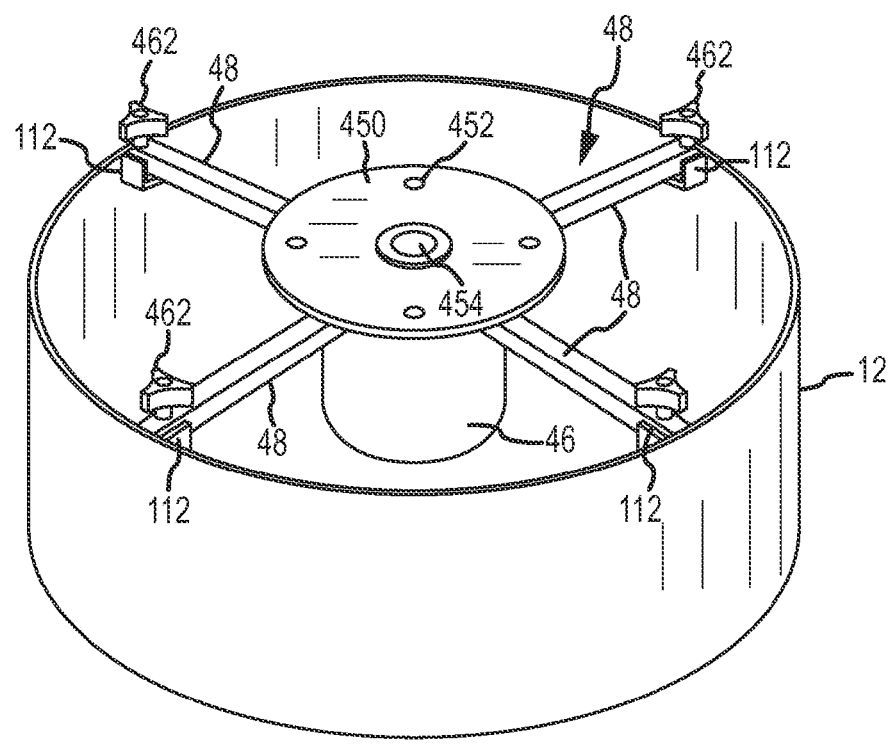
FIG. 26 is a perspective view of the motor mounted in the container assembly as viewed from underneath.

FIGS. 25 and 26 illustrate the construction of mounting arms 48 when motor fan blade assembly mounts 112 rather than motor fan blade assembly mounts 112' are used. Mounting arms 48 includes a motor plate 450 from which extend the plurality of mounting arms 48. Mounting arms 48 include an aperture 464 through which is captured, such as by a lock collar, snap ring, or collet, an adjustment knob 462. As shown in FIG. 26, adjustment knob 462 screws into motor fan blade assembly mounts 112. Accordingly, the exact position or relationship of cutting blade 42 to the bottom of grate 140 may be adjusted by turning knobs 462. It should be appreciated that outer ring 406 of cutting blade 42 is useful in preventing cutting blades 42 from catching on the slots or fasteners used to hold grate 140 in the container assembly 10. As shown in FIG. 25, motor 46 includes shaft 438 which supports the fan 44 and the cutting blade 42. Motor 46 may be provided with a cover 440 that includes a Velcro securement arrangement 442. The adjustment using adjustment knob 462 would be the same using motor fan blade assembly mounts 112'.

Figure 27:
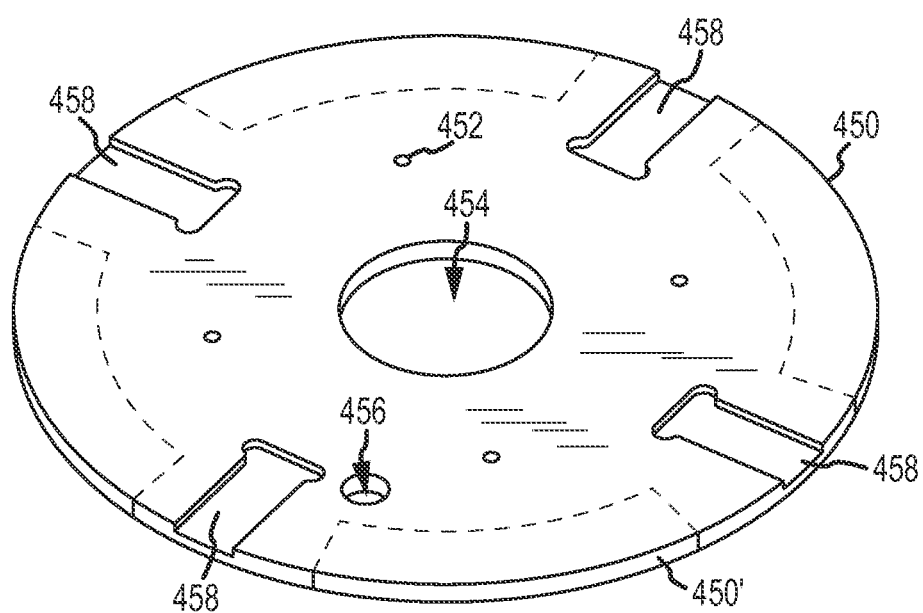
FIG. 27 is a perspective view of the motor plate shown in FIGS. 25 and 26.

With reference to FIG. 27, motor plate 450 includes a central cutout 454 to accommodate the motor bearing. Motor plate 450 is shown as substantially circular but in alternative configurations, motor plate 450 may include a plurality of cutouts 450' along the edges thereof. The cutouts 450' reduce the overall area of the motor plate 450 and facilitate airflow and operation of the plant trimming apparatus. Motor plate 450 also includes a plurality of mounting holes 452 for attaching the motor 46. Also shown in FIG. 27 is a plurality of datum grooves 458 which are formed in the motor plate 450. These slots are useful in locating the motor mount arms 460 which are attached to the motor plate 450 by bolts or by welding, for example. Again, the motor mount assembly 48 is comprised of aluminum; however, other materials may be used as appropriate. Motor plate 450 also includes an aperture 456 through which the various cables may be routed.

Figure 28:
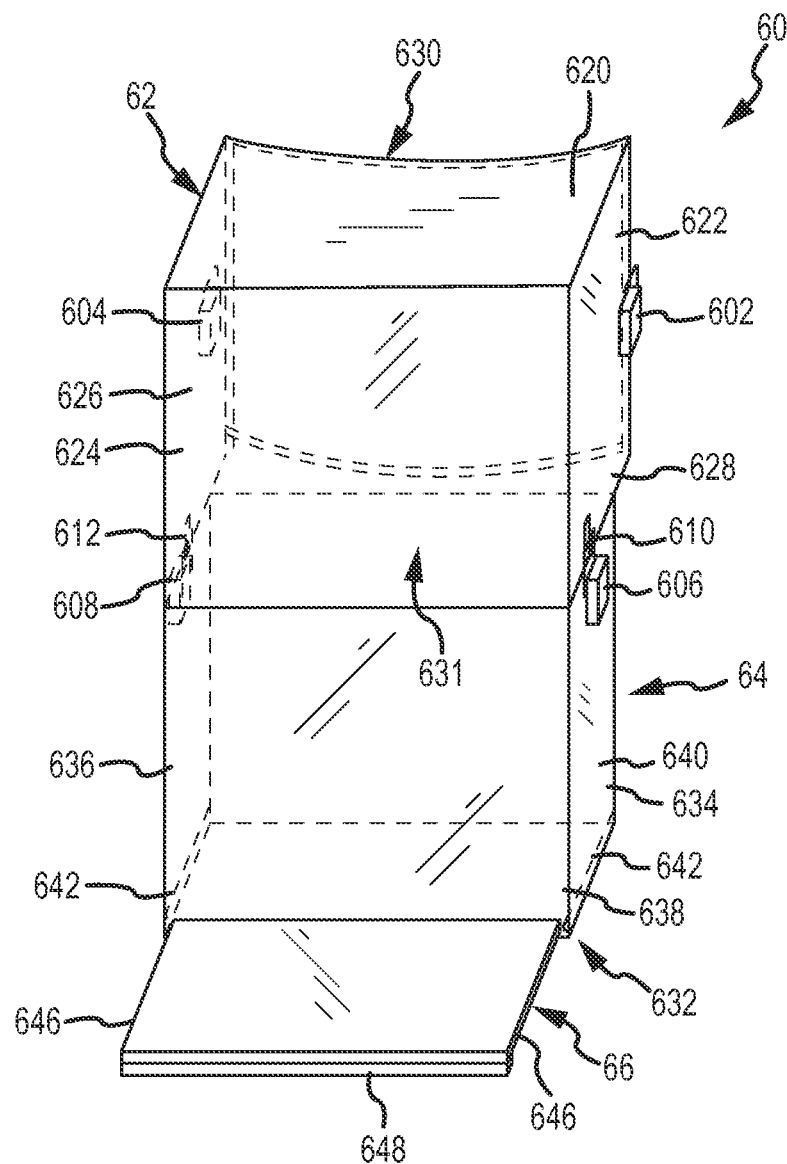
FIG. 28 is a perspective view of the chute assembly shown in FIG. 1.

With reference to FIG. 28, chute assembly 60 is comprised of an upper chute 62, a lower chute 64, and a chute door 66. Upper chute 62 is attachable to drum assembly 10 using latches 602 and 604 to cooperatively engage hooks 121 disposed on either side of opening 16. Upper chute 62 includes an upper wall portion 620 and left and right wall portions 622 and 624. A front wall portion 626 extends between side walls 622 and 624, and a lower wall portion 628 extends between side walls 622 and 624 as shown. Accordingly, upper chute 62 has a first opening 630 which is adjacent, when installed, to opening 16 of container assembly 10. Also, upper chute 62 includes a lower opening 631. Lower chute 64 connects to upper chute 62 with latches 606 and 608. Latches 606 and 608 attach to hooks 610 and 612 which are disposed on side walls 622 and 624 of upper chute 62. The lower chute 64 includes surrounding side walls which include left wall 636, right wall 634, lower wall 638, and front wall 640. Accordingly, lower chute 64 has an upper open end which is adjacent to open end 631 and a lower open end 632 through which product may be dispensed. Side walls 634 and 636 include slots 642 formed along a lower edge margin thereof. Slots 642 are sized and configured to receive chute door 66. The edges 646 of chute door 66 engage and seat into slots 642. Accordingly, chute door 66 may be moved back and forth to open and close lower chute 64. Chute door 66 also may include a hand grip 648 as shown. It can be appreciated from FIG. 28 that both the upper and lower chutes are formed generally as cubes with appropriate openings through which product may flow. However, other configurations of chutes may be employed, such as a envelope or the like that may engage with slot 642 instead of using the chute door 66.

Figure 29:
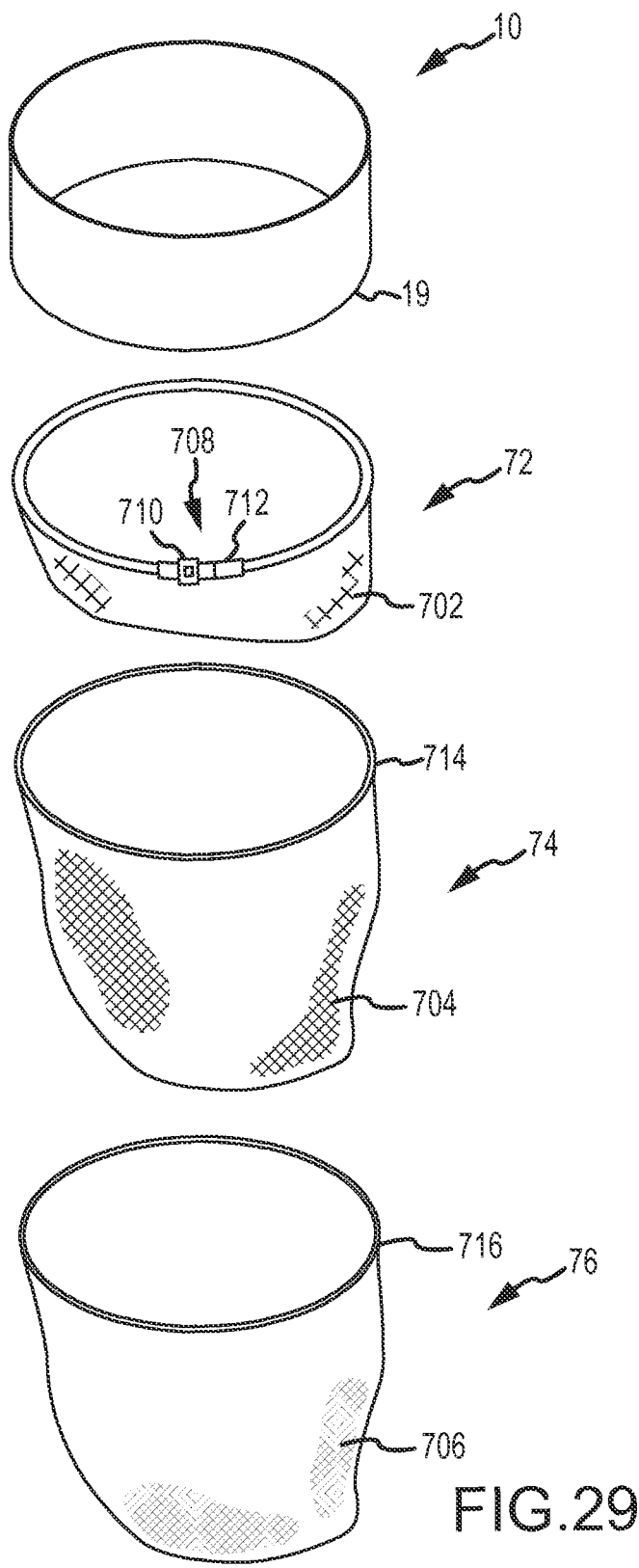
FIG. 29 is an exploded perspective view of the primary, secondary, and tertiary filter bags.

While more or less collection containers are possible, FIG. 29 illustrates an exemplary filtration system comprises filter bags 72, 74, and 76. As shown, primary filter bag 72 attaches to the lower rim 19 of container assembly 10. Primary filter bag 72 is comprised of a primary filter mesh material 702. In an embodiment, filter mesh 702 has a mesh opening size between 900 and 1100 microns. Primary filter bag 72 is attached to the container assembly by a Velcro fastener which includes a belt buckle 710 through which a portion of Velcro 712 is overlapped such that the upper margin of the filter bag may be cinched around the container assembly. A secondary filter bag 74, which is comprised of a secondary filter mesh 704, is attached over the primary filter bag 72. In an embodiment, filter mesh 704 has a smaller opening size than filter mesh 702. In one embodiment, the filter mesh 704 has a mesh opening size between 200-330 microns. In this case, the upper edge of filter bag 74 includes an elastic hem 714. A tertiary filter bag 76 is comprised of a tertiary filter mesh 706. Tertiary bag 76 is assembled over both the primary and secondary filter bags and again includes an elastic edge margin 716. In an embodiment, filter mesh 706 has a smaller opening than filter mesh 704. In one embodiment, the filter mesh 706 has a mesh opening size between approximately 100 and 200 microns. Primary filter bag 72 includes a relatively large mesh compared to the secondary filter bag 74. Similarly, the secondary filter bag has a mesh between the first and third filter bags. The meshes are sized to allow appropriate air flow from the fan 44.

Figure 30:
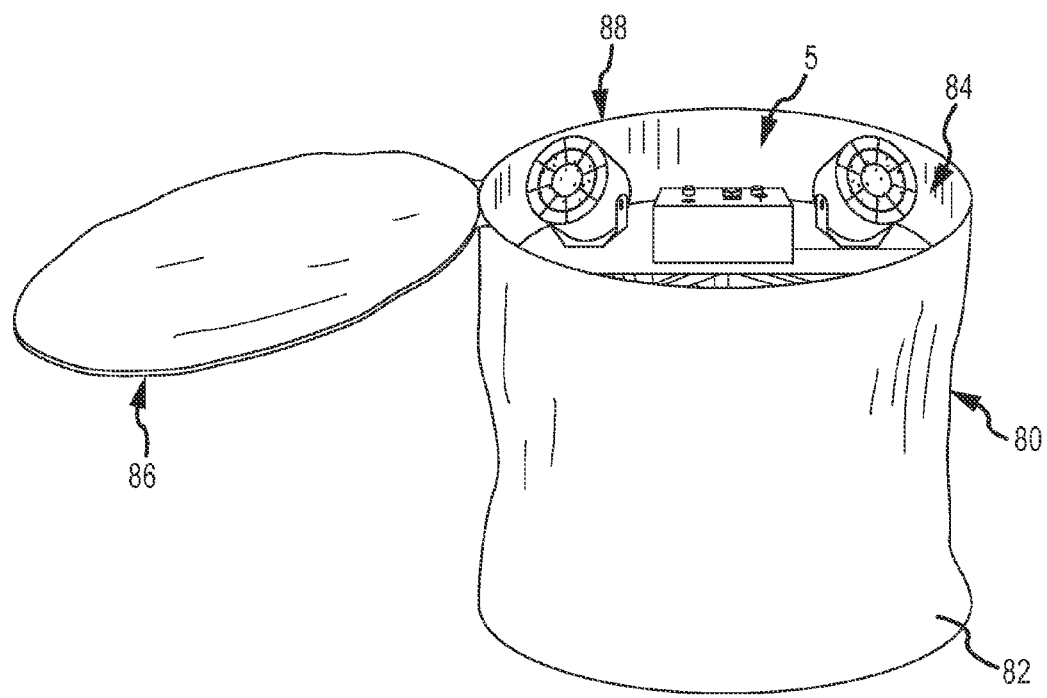
FIG. 30 is a perspective view of a transport case for use with the plant trimming apparatus.

FIG. 30 illustrates a representative carrying case 80 which may be used to transport plant trimming apparatus 5. As shown, the carrying apparatus 80 includes a surrounding side wall 82, defining an interior 84. Attached to surrounding side wall 82 is a lid or flap 86 which is secured around the opening by a zipper 88. Preferably, the carrying bag 80 is sized to contain the container assembly as well as the support stand 50 when in a collapsed or disassembled state.

Figure 31:
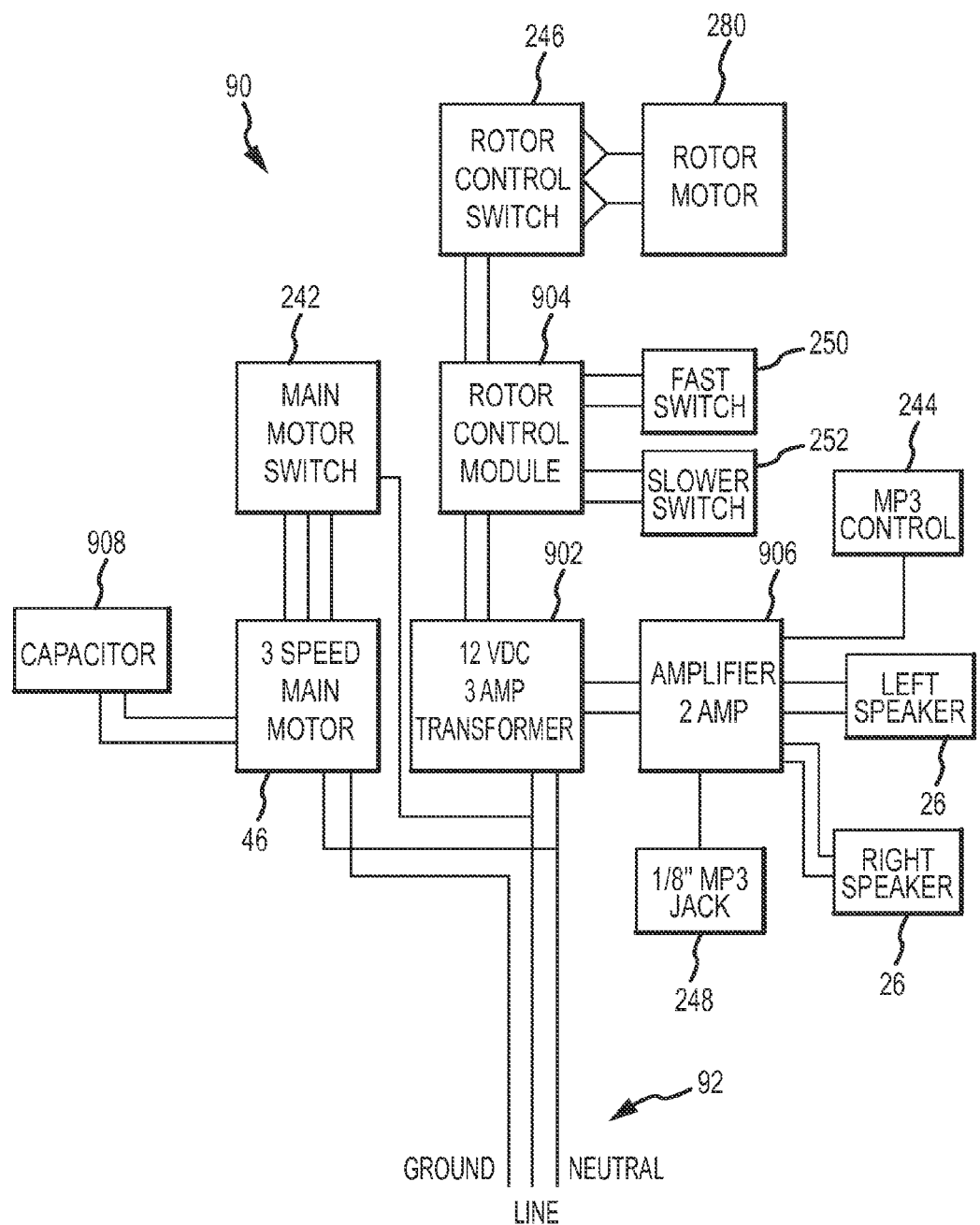
FIG. 31 is a schematic representation of the plant trimming apparatus wiring.

FIG. 31 illustrates a schematic representation of the wiring of the plant trimming apparatus 5. Power is transferred via lines 92 into a twelve-volt transformer 902 to supply DC power to the rotor control module 904. The rotor control switch 246 is connected to the rotor control module 904, and the rotor control switch 246 is in turn connected to the rotor motor 280. The fast and slow switch 250 and 252, respectively, are also connected to rotor control module 904. Optionally, the twelve-volt transformer 902 may also supply twelve volts to the amplifier 906 for the media player. Volume control 244 is also connected to amplifier 906 which powers left and right speakers 26. Amplifier 906 receives input from a media player via jack 248. The amplifier also receives a volume control input from control 244, and thereafter, powers left and right speakers 26 accordingly. Power is supplied to the main motor as well via lines 92 as the main motor switch 242. Capacitor 908 is connected to motor 46 to aid in starting the motor.

Having described the structure of the plant trimming apparatus, suggested steps for using and operating the apparatus are described. It is recommended that the larger leaves are removed from the plants to be processed before placing the plants into drum 12. It may be desirable to remove the larger leaves a day or two before trimming the plants. The larger leaves may be left on the plant; however, the blades 402 may need to be cleaned more often and the graded byproducts' purity may be contaminated. Once the large leaves are removed the flower may be removed from the plant and the flower's stem is trimmed. It is preferable if very little stem is exposed. It is recommend that the plants do not sit more than two hours after they are removed from the main stock.

The main motor 46 has three adjustable speeds allowing the user control of the airflow dynamics within drum 12. As mentioned above, however, the main motor may be a variable speed motor allowing the operator to set the speed over a continuum. Setting the speeds, such as from low to high, will change both the vortex as well as the suction. Low provides a slower vortex and a lower suction, high provides a faster vortex with greater suction. Note that opening the inner lids 206 will also change the airflow dynamics. With one or more lids 206 open, the vortex is slowed but greater suction is created. With lids 206 closed a stronger vortex is created and suction is minimized. Determining the proper speeds based on product type, density, size, quality and quantity, will aid in the trimming apparatus' ability to perform properly and efficiently.

The rotor switch 246 provides the option to rotate the agitator assembly 30 forward, with the vortex, or in reverse, against the vortex. The rotor speed can also be adjusted in forward and reverse as desired. Determining the proper rotor speed based on product type, density, size, quality and quantity, will also aid the trimming apparatus' ability to perform properly and efficiently.

As described above the lid assembly 20 includes large outer lids 204, front and back, and a smaller inner lids 206, front and back. The outer lids 204 are typically only opened when removing the agitator assembly 30 or when cleaning/packing the unit for storage. The two smaller inner lids 206 have two purposes. The first is to create an opening when placing product into drum 12. The second is to provide control of the airflow dynamics. By opening one or more of the lids 206 the amount of suction and the speed of the vortex can be controlled.

For most strains of plants it is recommend that the cutting blade 42 is adjusted to within ⅛ inch of grate 140. Also, the main motor is set on low, and the rotor set for forward rotation (with the vortex) and a higher speed. Two heaping handfuls of plant product (approximately 2-3 liter/quart) are inserted into the drum and allowed to process for approximately 1.5 minutes with the two smaller lids 206 closed. Running the apparatus with the smaller lids 206 closed creates a stronger vortex and allows the product to move easier and enable the apparatus to remove the majority of the leaf product. Removing the leaf product facilitate movement of the flowers, etc. Next, the back small lid 206 should be opened and the apparatus allowed to run for an additional time. In the normal course, the run time should be approximately 1 minute, however, the run time may be as little as about 30 seconds to as much as about 2 minutes depending on strain, density, water weight, speed, vortex, quantity inserted, etc., and the like. Opening the back smaller lid 206 for the last half of the cycle creates a stronger suction, keeping the product tight to the grate and slowing down the rotation. Because the majority of the leaf product has already been removed, the remaining product begins to move faster as the cycle progresses with the small lid closed. Next, the operator opens gate 124 and to allow product to empty into the lower chute 64. Typically, closing the inner lids 206 facilitates movement of product through the gate 124. The movement of the product may be induced by pumping, opening and closing one or more of the inner lids 206, the pumping action may be automated. The lower chute should be full after a completed cycle. Close the drum gate 124 before emptying the product out of the lower chute container. Typically rotor is reversed only if there is product caught on the grate or between the rotor fingers. By putting the rotor in reverse, often times the product will become dislodged. Once the product has completed its cycle it is emptied placed on a fabric drying rack. Spreading the trimmed product out thinly and evenly on fabric, or other suitable, drying racks usually provides good results. The trimmed product should be occasionally and carefully rotated during the drying process to aid in a more consistent and desirable cure.

Methods relating to the above described plant trimming apparatus are also contemplated. The methods thus encompass the steps inherent in the above described structures and operation thereof. In an exemplary embodiment, trimming a plant comprises placing a plant on an upper surface of a grate the product is moved by the air vortex from the fan blade and moving a plurality of fingers about the upper surface of the grate, helping to turn or roll the flowers thereby moving the plant about the upper surface such that selected portions of the plant are received through the grate. The selected portions of the plant are cut off with a rotating blade that is positioned adjacent a lower surface of the grate. An airflow is created that moves from the upper surface of the grate toward the lower surface of the grate and the selected portions cut from the plant are collected in a collection bag. Moving the plant about the surface and cutting the selected portions off the plant generates plant pieces of various sizes and selected plant pieces of a first size may be collected in a first collection bag. The method may further comprise collecting selected plant pieces of a second size in a second collection bag and selected plant pieces of a third size in a third collection bag (or more than the 3). The plurality of fingers is rotated about the grate in a first direction and may be subsequently rotated in a second direction.

With reference now to FIGS. 32 and 33, a plant trimming apparatus 5' includes a container assembly 10 which is covered by a lid assembly 20. Also attached to container assembly 10 is a chute assembly 60. The container assembly 10 is supported on a collapsible frame assembly 50'. Container assembly 10 supports a plurality of filter bags 72, 74, and 76 to receive the product. The collapsible frame assembly 50' unlike collapsible frame assembly 50 is provided in the form of a front leg assembly 1000 and a rear leg assembly 1010. The front and rear leg assemblies 1000, 1010 are generally U-shaped tubular members with vertical telescoping members 1002 comprising an upper member 1004 and a lower member 1004'. Horizontal telescoping members 1006 comprising a left member 1008 and a right member 1008'. The telescoping members may be held locked in open or closed positions using a spring loaded button and detent as explained above for other telescoping members. The collapsible frame assembly 50' is attachable to the container assembly 10 using the container mount 506', which is connectable to the drum mount 130 in a manner described above. The container mount 506' differs from the container mount 506 in that the front leg assembly 1000 and the rear leg assembly 1010 are connected to the container mount 506' using a pivot fastener 1012 that extends through bore 1014 into bore 1016 in container mount 506'. The pivot fastener 1012 (which may be a bolt 1012*b* and nut 1012*n* or the like) acts as a pivot axis to allow the front leg assembly 1000 and the rear leg assembly 1010 to open and close in a folding relationship as shown by arrow 1016. The arc of the folding may be controllable by slots 1018 in container mount 506' that receive a protrusion 1020 on leg assemblies 1000, 1012. The protrusion 1020 may be formed monolithic with the leg assemblies or not.

Accordingly, the plant trimming apparatus and various methods of using the apparatus have been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A plant trimming apparatus, comprising:
   a container;
   a grate supported within the container, wherein the grate includes openings sized and configured to selectively receive parts of a plant therethrough;
   a cutting blade rotatably supported and in fluid communication with the container and adjacent the grate;
   a fan blade rotatably supported and in fluid communication with the container;
   at least one agitator arm rotatably disposed within the container above the grate, wherein the at least one agitator arm comprises a plurality of flexible fingers are disposed within the container and extend from the agitator arm towards the grate and configured to move the received parts of a plant; and
   a bag in fluid communication with the container wherein the grate, cutting blade and fan cooperatively operate to move plant product from the container to the bag.

2. The plant trimming apparatus according to claim 1, wherein the container is a cylindrical drum.

3. The plant trimming apparatus according to claim 1, further comprising a blade motor including a shaft, wherein the cutting blade is supported on the shaft.

4. The plant trimming apparatus according to claim 1, wherein the container has an upper rim portion and a lower rim portion and further comprising a lid assembly attached to the upper rim portion, wherein the lid comprises at least one door movable between an open and a closed state.

5. The plant trimming apparatus according to claim 1, wherein the cutting blade includes a plurality of rear leaning blades that cooperate with the grate openings to cut parts off the plant.

6. The plant trimming apparatus according to claim 5, wherein the blade has an outer ring extending between each of the plurality of blades.

7. The plant trimming apparatus according to claim 1, wherein the container has a top end region and a bottom end region, wherein the fan blade is operative to create an air flow from the top end region to the bottom end region.

8. The plant trimming apparatus according to claim 7, wherein the bag comprises a primary collection bag attached to a bottom rim portion of the container, wherein the primary collection bag comprises a first material having a first mesh size.

9. The plant trimming apparatus according to claim 4, wherein the fan blade creates a vortex within the container and wherein the vortex configuration changes between the open and closed states.

10. The plant trimming apparatus according to claim 1, further comprising an agitator motor, wherein the at least one agitator arm is connected to the agitator motor.

11. The plant trimming apparatus according to claim 1, wherein the grate includes a plurality of elongate slots each having an eased edge.

12. The plant trimming apparatus according to claim 11, wherein the grate has a thickness and the coved edge extends between approximately 50% to 85% through the thickness.

13. The plant trimming apparatus according to claim 11, wherein the plurality of elongate slots are arranged in a pattern, wherein the pattern is selected from a group of patterns consisting of: circular or spiral.

14. The plant trimming apparatus according to claim 1, wherein the flexible fingers comprise silicone.

15. A plant trimming apparatus, comprising:
a container;
a grate supported within the container, wherein the grate includes openings sized and configured to selectively receive parts of a plant therethrough;
a cutting blade rotatably supported and in fluid communication with the container and adjacent the grate;
a fan blade rotatably supported and in fluid communication with the container;
at least one agitator arm rotatably disposed within the container above the grate;
a primary collection bag comprising a first material having a first mesh size that is attached to a bottom rim portion of the container; and
a secondary collection bag attached proximate the bottom rim portion of the container, wherein the secondary collection bag comprises a second material having a second mesh size smaller than the first mesh size, wherein
the primary collection bag and secondary collection bag are in fluid communication with the container wherein the grate, cutting blade and fan cooperatively operate to move plant product from the container to the primary collection bag and the secondary collection bag.

16. The plant trimming apparatus according to claim 15, further comprising a tertiary collection bag attached proximate the bottom rim portion of the container, wherein the tertiary collection bag comprises a third material having a third mesh size smaller than the second mesh size.

17. A plant trimming apparatus, comprising:
a cylindrical container;
a grate supported within the container;
a cutting blade rotatably supported within the container and adjacent the grate;
a fan blade rotatably supported within the container;
a primary collection bag attached to a bottom rim portion of the container, wherein the primary collection bag comprises a first material having a first mesh size; and
a secondary collection bag attached proximate the bottom rim portion of the container, wherein the secondary collection bag comprises a second material having a second mesh size smaller than the first mesh size.

18. The plant trimming apparatus according to claim 17, further comprising a tertiary collection bag attached proximate the bottom rim portion of the container, wherein the tertiary collection bag comprises a third material having a third mesh size smaller than the second mesh size.

19. A method of trimming a plant, comprising:
providing a container configured to hold a plant wherein a bottom surface of the container comprises a grate;
placing the plant in the container on an upper surface the grate;
moving a plurality of fingers within the container about the upper surface of the grate, thereby aiding in moving the plant about the upper surface;
receiving selected portions of the plant through the grate, cutting the selected portions off of the plant with a rotating blade positioned adjacent a lower surface of the grate;
creating an airflow in a form of a vortex moving from the upper surface of the grate toward the lower surface of the grate; and
collecting the selected portions in a collection bag.

20. The method according to claim 19, wherein moving the plant about the surface and cutting the selected portions off the plant generates plant pieces of various sizes, further comprising collecting selected plant pieces of a first size in a first collection bag.

21. A method of trimming a plant, comprising:
placing a plant on an upper surface of a grate;
moving a plurality of fingers about the upper surface of the grate, thereby aiding in moving the plant about the upper surface;
receiving selected portions of the plant through the grate;
cutting the selected portions off of the plant with a rotating blade positioned adjacent a lower surface of the grate, wherein cutting the selected portions off of the plant generates plant pieces of various sizes including at least a first size and a second size;
creating an airflow in a form of a vortex moving from the upper surface of the grate toward the lower surface of the grate;
collecting the selected portions of a first size in a first collection bag; and
collecting selected portions of a second size in a second collection bag.

22. The method according to claim 21, further comprising collecting selected plant pieces of a third size in a third collection bag.

23. The method according to claim 19, wherein the plurality of fingers are rotated about the grate in a first direction.

24. The method according to claim 23, further comprising rotating the plurality of fingers in a second direction.

25. The method according to claim 23, wherein the rotating blade rotates in the first direction.

* * * * *